(12) United States Patent
Brainard et al.

(10) Patent No.: US 8,349,990 B2
(45) Date of Patent: Jan. 8, 2013

(54) CHAIN SCISSION POLYESTER POLYMERS FOR PHOTORESISTS

(75) Inventors: Robert L. Brainard, Albany, NY (US); Srividya Revuru, Niskayuna, NY (US)

(73) Assignee: The Research Foundation of State University of New York, Albany, NY (US)

( * ) Notice: Subject to any disclaimer, the term of this patent is extended or adjusted under 35 U.S.C. 154(b) by 0 days.

(21) Appl. No.: 12/918,647

(22) PCT Filed: Feb. 20, 2009

(86) PCT No.: PCT/US2009/034707
§ 371 (c)(1),
(2), (4) Date: Feb. 14, 2011

(87) PCT Pub. No.: WO2009/105667
PCT Pub. Date: Aug. 27, 2009

(65) Prior Publication Data
US 2011/0127651 A1    Jun. 2, 2011

Related U.S. Application Data

(60) Provisional application No. 61/030,046, filed on Feb. 20, 2008.

(51) Int. Cl.
*C08G 73/00* (2006.01)
*C08G 63/02* (2006.01)

(52) U.S. Cl. .............. 528/170; 257/632; 430/270.1; 430/319

(58) Field of Classification Search .......... 257/632; 430/270.1, 319
See application file for complete search history.

(56) References Cited

U.S. PATENT DOCUMENTS

| 5,039,596 | A | 8/1991 | Wu et al. |
| 5,733,479 | A | 3/1998 | Kahle, II et al. |
| 6,280,901 | B1 | 8/2001 | Aviram et al. |
| 2006/0247400 | A1 | 11/2006 | Sounik et al. |

OTHER PUBLICATIONS

International Search Report for PCT/US2009/034707 dated Sep. 29, 2009.
Written Opinion of the International Searching Authority dated Sep. 29, 2009.

*Primary Examiner* — Terressa Boykin
(74) *Attorney, Agent, or Firm* — Heslin Rothenberg Farley & Mesiti P.C.

(57) ABSTRACT

Polymers for extreme ultraviolet and 193 nm photoresists are disclosed. The polymers comprise a photoacid generator (PAG) residue, an acid cleavable residue and a diacid joined by ester linkages. The polymers include a photoacid generating diol, a diacid and an acid table diol.

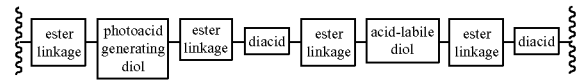

26 Claims, No Drawings

CHAIN SCISSION POLYESTER POLYMERS FOR PHOTORESISTS

CROSS REFERENCE TO RELATED APPLICATIONS

This application claims priority to PCT/US2009/034707, filed Feb. 20, 2009 and published as WO 2009/105667 on Aug. 27, 2009, which claims priority of U.S. provisional application 61/030,046, filed Feb. 20, 2008; the entire contents of each are incorporated herein by reference.

FIELD OF THE INVENTION

The invention relates to polymers for extreme ultraviolet and 193 nm photoresists. The polymers comprise a photoacid generator (PAG) residue, an acid cleavable residue and a diacid joined by ester linkages.

BACKGROUND OF THE INVENTION

Extreme Ultraviolet (EUV, 13.5 nm) imaging technology continues to be the primary option for the 22 nm microelectronics node. However, EUV resist performance remains one of the largest barriers to EUV technology implementation, because it is difficult to simultaneously meet performance targets for resolution, line width roughness (LWR) and sensitivity. For example, low concentrations of acid during imaging will yield rough lines (high LWR), but good sensitivity; high concentrations of acid will give smoother lines, but poor sensitivity. To break through to a new level of performance, new materials must be developed that will make improvements toward one performance target without compromising the performance of the other two.

Photoacid generators have been known in the polymer art for decades. Typical first-generation ionic PAGs are sulfonium and iodonium salts. In an early approach to a deep ultraviolet (DUV or 248 nm) photoresist or a 193 nm photoresist, the PAG is randomly dissolved within the polymer film. The polymer has an ester with a side-chain blocking group (e.g. t-butyl) that can be removed with catalytic acid, yielding a developer-soluble carboxylic acid. The advantage of this approach is that these resists are relatively inexpensive and simple to prepare using standard formulation methods. The resists have high sensitivity because acids are free to diffuse through the film, catalyzing acidolysis reactions (removal of ester blocking group) with large turnover numbers. The disadvantage of this approach is that the acid's rapid diffusion limits the ultimate resolution that can be achieved because the acid can diffuse into the unexposed regions of the resist—blurring the aerial image. In a second approach, the chromophore end of the PAG is bound to the polymer and the acid is free to diffuse in the film. The advantage of this approach is that the high acid diffusion rate gives these resists relatively high sensitivity, however, the disadvantage is that the high acid diffusion rate limits resolution. In a third possible approach the photogenerated acid is bound to the middle of a polymer chain and cannot diffuse very far. The advantage of this approach is that the resist's resolution will not be limited by acid diffusion. The disadvantage, however, is that the resist will have low photosensitivity, as the acid's limited movement will keep turnover numbers low.

SUMMARY OF THE INVENTION

The invention disclosed herein relates to a new resist system based on a polymer with PAG and ester functionality located within the main polymer chain. When the PAG breaks apart photochemically or the ester-linkages break apart by acidolysis, the molecular weight of the polymer decreases, allowing for higher acid diffusion during bake and faster resist dissolution during development. This new polymer will be referred to as a chain scission polyester PAG-polymer (CSP$^3$). With CSP$^3$ the photochemical reaction breaks the polymer chain and produces a polymer-bound acid at a chain end. Then, the photogenerated acid catalyzes the transformation of the ester to the developer-soluble carboxylic acid by once again breaking the polymer chain. The resulting areas of the resist exposed to light and subjected to acidolysis reactions will have much lower molecular weight resulting from the chain scission reactions. This provides lower Tg, higher acid diffusion rates, and faster dissolution rates.

In its broadest aspect, the invention relates to a polymer comprising at least one unit of the formula

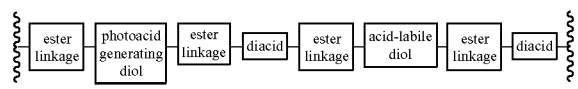

In one embodiment, the polymer comprises repeating units of the formula

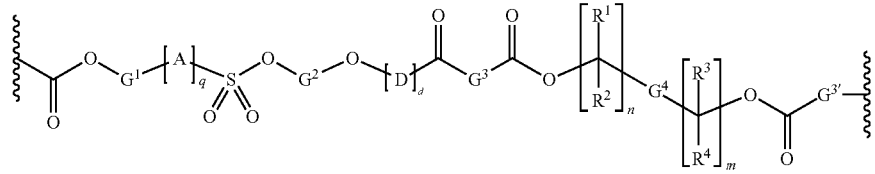

wherein
G$^1$ is selected from a direct bond, C$_1$-C$_8$ alkane, C$_1$-C$_8$ fluoroalkane, arene and fluoroarene;
A is G$^{2a}$-O—SO$_2$—C$_{1-8}$ hydrocarbon or G$^{2a}$-O—SO$_2$—C$_{2-14}$ hydrocarbon ether;
q is 0 or 1, with the proviso that if G$_1$ is a direct bond, q is 1;
G$^2$ and G$^{2a}$ are each independently an imide of empirical formula C$_{4-20}$H$_{3-12}$N$_{1-2}$O$_{2-5}$;
D is SO$_2$—C$_{1-6}$ fluoroalkane or SO$_2$-fluoroarene;
d is 0 or 1;
G$^3$ and G$^{3'}$ are selected independently from a direct bond or a C$_1$-C$_{20}$ hydrocarbon;
G$^4$ is a direct bond or C$_1$-C$_{20}$ hydrocarbon;
R$^1$, R$^2$, R$^3$ and R$^4$ are:
  (a) independently in each occurrence a C$_1$-C$_8$ hydrocarbon; or
  (b) two R groups form a 5 or 6 membered carbocycle and the remaining R groups are independently in each occurrence a C$_1$-C$_8$ hydrocarbon; or
  (c) R$^1$ is H, R$^2$ is a C$_1$-C$_8$ hydrocarbon such that heterolytic cleavage of the oxygen-carbon bond adjacent R$^2$ produces a carbocation that is more stable than a secondary alkyl carbonium ion, and R$^3$ and R$^4$ are independently in each occurrence a C$_1$-C$_8$ hydrocarbon; or
  (d) R$^1$ and R$^3$ are H and R$^2$ and R$^4$ are C$_1$-C$_8$ hydrocarbons such that heterolytic cleavage of the oxygen-carbon bond adjacent R$^2$ and R$^4$ produces a carbocation that is more stable than a secondary alkyl carbonium ion; and
m is zero or 1; n is zero or 1 and the sum of m+n is 1 or 2.

In an embodiment, the polymer comprises repeating units of the formula

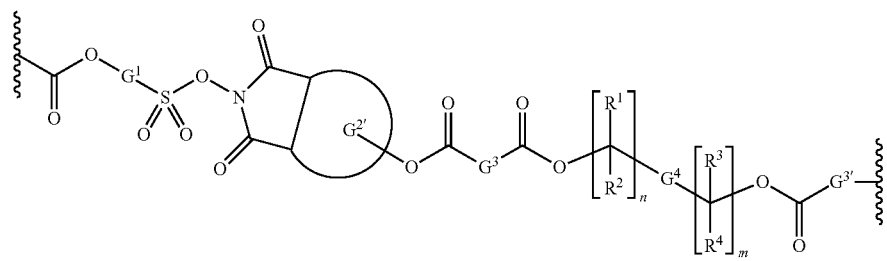

wherein
$G^1$ is a fluoroalkane or fluoroarene;
$G^{2'}$ is a fused carbocycle or heterocycle.

In a further aspect, the invention relates to a method for patterning a substrate comprising:
(a) depositing a polymer as described above on a surface of a substrate;
(b) imagewise exposing the polymer on the surface to actinic radiation; and
(c) developing the exposed polymer to remove portions of the polymer.

In a further aspect, the invention relates to a method for making a semiconductor device comprising:
(a) depositing a polymer as described above on a surface of a substrate;
(b) imagewise exposing the polymer on the surface to actinic radiation;
(c) developing the exposed polymer to remove portions of the polymer and expose portions of the surface;
(d) altering the surface of the substrate; and
(e) removing remaining polymer from the surface.

In a further aspect, the invention relates to a semiconductor device produced by the foregoing method.

In further aspects, the invention relates to a photoresist formulation comprising a solvent and a polymer as described above and to a photoresist comprising a polymer as described above.

DETAILED DESCRIPTION OF THE INVENTION

In its broadest aspect, the invention relates to a polymer comprising at least one unit of the formula

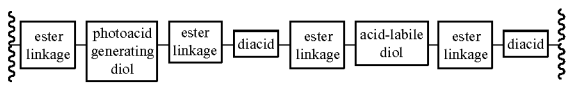

This unit will be referred to as PDAD (Photoacid generating diol/Diacid/Acid-labile diol/Diacid). In this formula, the terms "photoacid generating diol", "diacid" and "acid-labile diol" are shorthand for the residues derived from these elements. The "diols" are not, in fact diols, but rather diols minus their alcoholic hydrogens; similarly the diacids are minus their carboxylic OH's, the elements of water having been given up to from the ester linkages. For example, in the following sequence, which is provided for illustration:

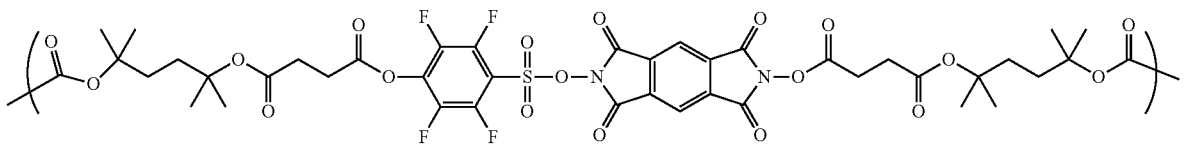

the "photoacid generating diol", "diacid" and "acid-labile diol" elements are shown:

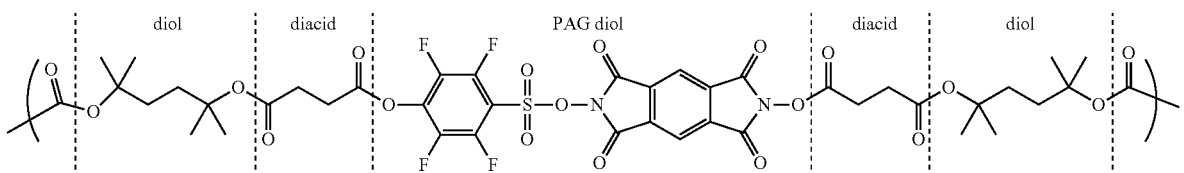

These diol and diacid residues are joined by the formal elimination of water and formation of ester bonds as shown:

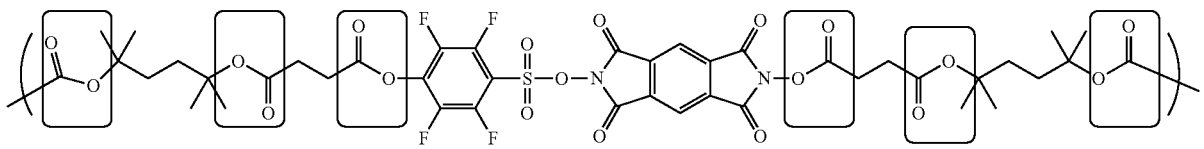

The polymer will usually comprise multiple PDAD units. While it may be possible to construct polymers that are entirely PDAD multimers, that is not necessary or, in many cases, desirable. Because the molecular weight of the polymer is important to its utility as a photoresist, it will often be the case that the PDAD units are interspersed in a polyester polymer that is comprised of other diacids and diols commonly found in polyester resins.

In one embodiment, the polymer comprises repeating units of Structure 1:

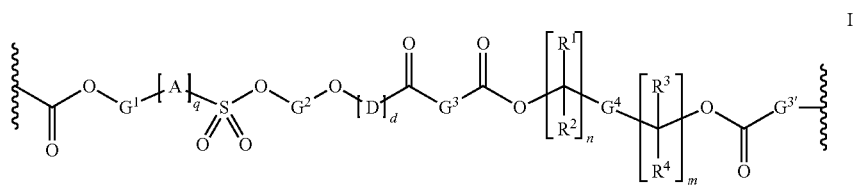

I

In one embodiment, the PDAD unit may be represented by Structure II:

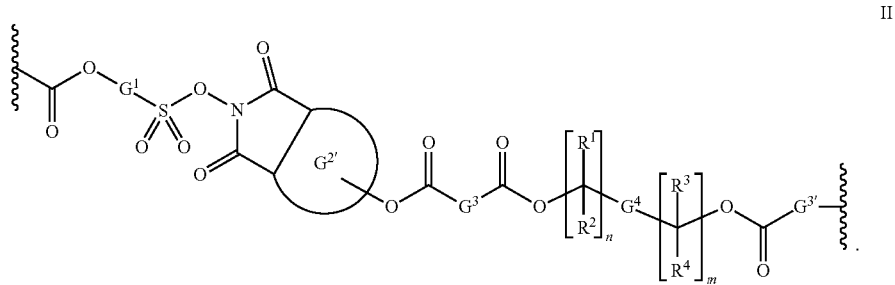

II

An example of a polymer that includes a PDAD of this formula is

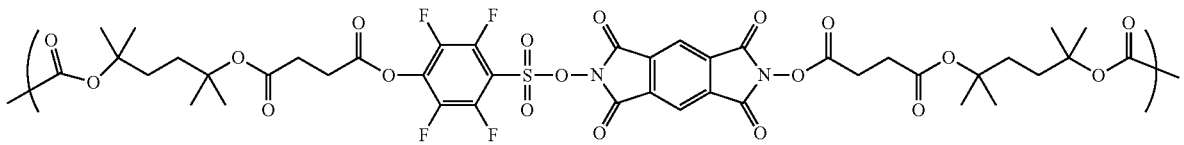

In this particular example, the subunits are

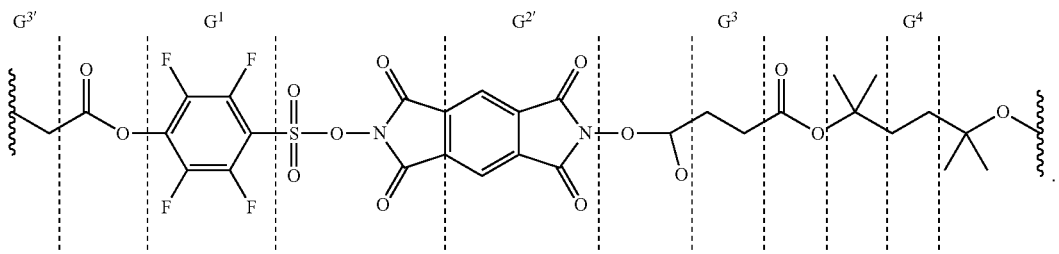 [SMILES: *CC(=O)Oc1c(F)c(F)c(S(=O)(=O)On2c(=O)c3cc4c(=O)n(OC(O)CCC(=O)OC(C)(C)CCC(C)(C)O*)c(=O)c4cc3c2=O)c(F)c1F]

In some embodiments of the invention, $G^1$ is $C_1$-$C_8$ alkane. In other embodiments of the invention, $G^1$ is fluoroalkane. In some embodiments, $G^1$ is arene. In other embodiments, $G^1$ is fluoroarene. In further embodiments, $G^1$ is chosen from tetrafluorophenylene and polyfluoro($C_1$-$C_6$)alkyl. In some embodiments of the invention represented by Structure I, $G^1$ is a direct bond. It will be appreciated by persons of skill that, if $G^1$ is a direct bond, a residue A would be interposed to avoid the presence of a sulfate bond.

In some embodiments of the invention, A is $G^{2a}$-O—$SO_2$—$C_{1-8}$ hydrocarbon. In other embodiments, A is $G^{2a}$-O—$SO_2$—$C_{2-14}$ hydrocarbon ether. In further embodiments, A is selected from $G^{2a}$-O—$SO_2$—$C_{1-6}$alkyl, $G^{2a}$-O—$SO_2$—$C_{5-6}$cycloalkyl or $G^{2a}$-O—$SO_2$-aryl and $G^{2a}$-O—$SO_2$—$C_{2-14}$ hydrocarbon ether. In still other embodiments, A is selected from $G^{2a}$-O—$SO_2$-phenyl, $G^{2a}$-O—$SO_2$-phenoxybenzene and $G^{2a}$-O—$SO_2$—$C_{1-4}$ alkyl.

In some embodiments, q is 0. In other embodiments, q is 1. If $G^1$ is a direct bond, q is 1.

In some embodiments of the invention, $G^{2a}$ is an imide of empirical formula $C_{4-20}H_{3-12}N_{1-2}O_{2-5}$. In other embodiments, $G^{2a}$ is

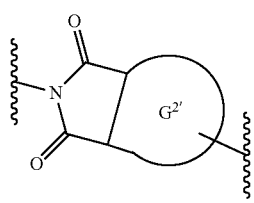

and $G^{2'}$ is a fused carbocycle or heterocycle. In some embodiments, $G^{2a}$ may be represented by the examples shown below:

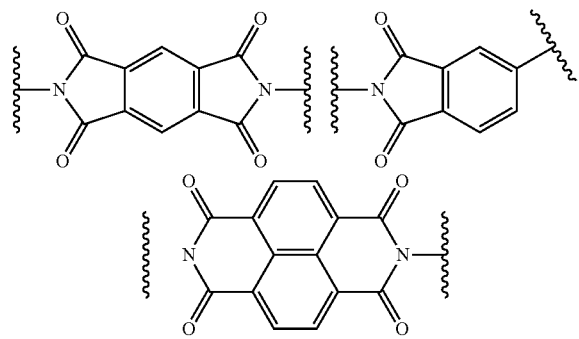

-continued

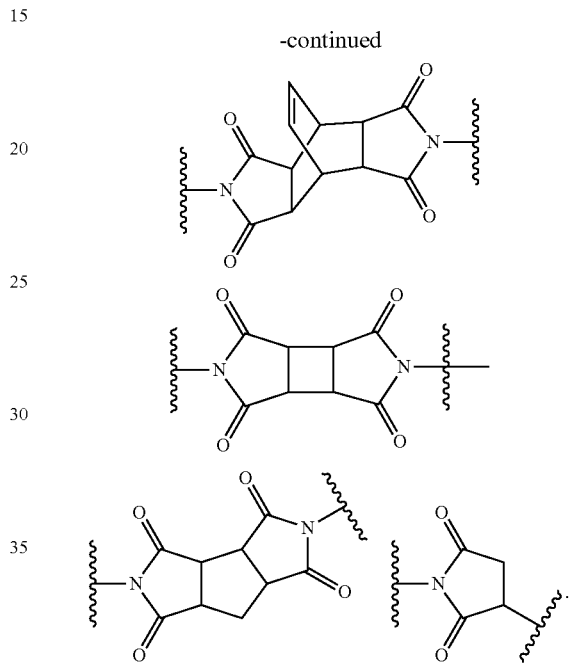

In some embodiments of the invention, $G^2$ is an imide of empirical formula $C_{4-20}H_{3-12}N_{1-2}O_{2-5}$. In further embodiments, $G^2$ may be

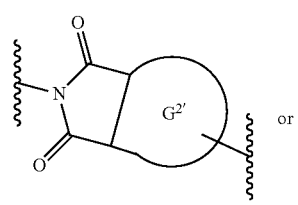

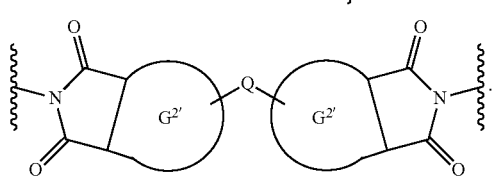

In these examples, $G^{2'}$ is a fused carbocycle or heterocycle. In some of these examples, Q is O. In other examples Q is $CH_2$. In further embodiments, Q is $CH(CH_3)$. In still other embodiments, Q is $C(CH_3)_2$. In some embodiments, $G^2$ may be represented by the examples shown below:

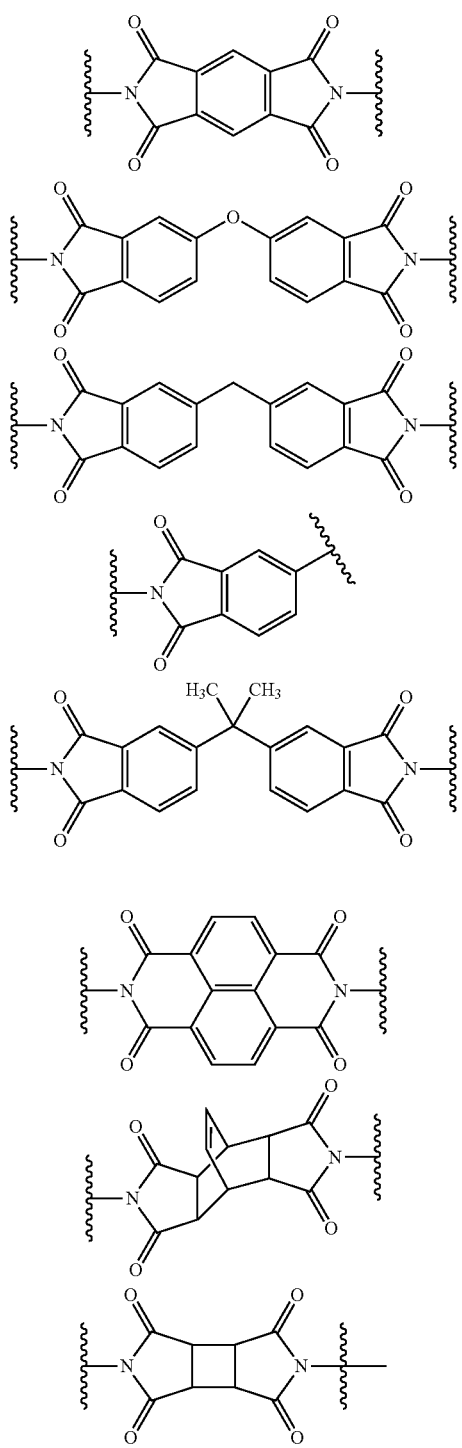

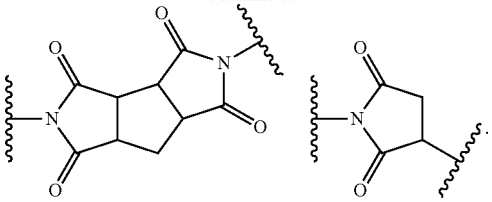

In all of the foregoing embodiments, the imide is embedded in a five or six-membered ring, i.e. the imide is found in the form of a dioxopyrrolidine or dioxopiperidine.

In some embodiments of the invention, D is $SO_2$—$C_{1-6}$ fluoroalkane. In other embodiments, D is $SO_2$-fluoroarene. For instance, D may be selected from $SO_2$-tetrafluorophenylene and $SO_2$-polyfluoro($C_{1-6}$)alkyl in some embodiments.

In some embodiments, d is 0. In other embodiments, d is 1.

In certain embodiments of the invention, $G^3$ is a direct bond. In other embodiments, $G^3$ is a $C_1$-$C_{20}$ hydrocarbon. In certain embodiments of the invention, $G^{3'}$ is a direct bond. In other embodiments, $G^{3'}$ is a $C_1$-$C_{20}$ hydrocarbon. For instance, in some embodiments, $G^3$ and/or $G^{3'}$ may be represented by a direct bond, —$CH_2$—, —$CH_2CH_2$—, —$CH_2CH_2CH_2$—, —$CH_2CH_2CH_2CH_2$—, —CH=CH—, —C(=$CH_2$)$CH_2$—, —C($CH_3$)$_2$—, —C(Et)$_2$-, o-phenylene, phenylene, m-phenylene, p-phenylene or bicyclo[2.2.1]heptan-2,3-diyl.

In some embodiments of the invention, $G^4$ is a direct bond. In other embodiments, $G^4$ is a $C_1$-$C_{20}$ hydrocarbon. For instance, in some embodiments, $G^4$ may be a direct bond, —$CH_2$— or —$CH_2CH_2$—. In other embodiments, $G^4$ is a $C_1$-$C_8$ hydrocarbon, $C_1$-$C_6$ hydrocarbon or a $C_1$-$C_4$ hydrocarbon, for example cyclohexyl, butyl or dimethylpropyl.

In certain embodiments of the invention, $R^1$, $R^2$, $R^3$ and $R^4$ are independently in each occurrence a $C_1$-$C_8$ hydrocarbon. In other embodiments of the invention, two of $R^1$, $R^2$, $R^3$ and $R^4$ form a 5 or 6 membered carbocycle and the two remaining R groups are independently in each occurrence a $C_1$-$C_8$ hydrocarbon. In still other embodiments, $R^1$ is H, $R^2$ is a $C_1$-$C_8$ hydrocarbon such that heterolytic cleavage of the oxygen-carbon bond adjacent $R^2$ produces a carbocation that is more stable than a secondary alkyl carbonium ion, and $R^3$ and $R^4$ are independently in each occurrence a $C_1$-$C_8$ hydrocarbon. In yet other embodiments, $R^1$ and $R^3$ are H and $R^2$ and $R^4$ are $C_1$-$C_8$ hydrocarbons such that heterolytic cleavage of the oxygen-carbon bond adjacent $R^2$ and $R^4$ produces a carbocation that is more stable than a secondary alkyl carbonium ion.

In some embodiments, m is zero. In other embodiments, m is 1. In still other embodiments, n is zero. In further embodiments, n is 1. The sum of m+n is 1 or 2.

In some embodiments incorporating Structure II, $G^1$ is a fluoroalkane. In other embodiments, $G^1$ is fluoroarene. In still other embodiments, $G^1$ is chosen from tetrafluorophenylene and polyfluoro($C_1$-$C_6$)alkyl.

In some embodiments of the invention incorporating Structure I

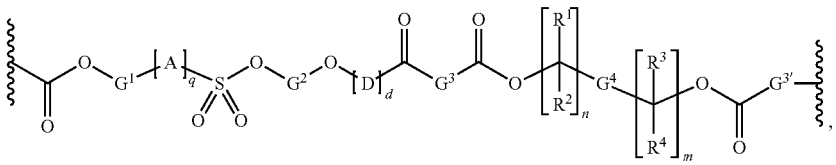

$G^1$ is a direct bond; A is selected from $G^{2a}$-O—$SO_2$—$C_{1-8}$ alkyl, $G^{2a}$-O—$SO_2$—$C_{5-6}$cycloalkyl or $G^{2a}$-O—$SO_2$-aryl and $G^{2a}$-O—$SO_2$—$C_{1-14}$ hydrocarbon ether; and q is 1. Examples of these are shown below in (82), (78) and (80). In further embodiments, A is selected from $G^{2a}$-O—$SO_2$-phenyl, $G^{2a}$-O—$SO_2$-phenoxybenzene and $G^{2a}$-O—$SO_2$—$C_{1-4}$ alkyl.

In other embodiments of the invention incorporating Structure I, $G^1$ is fluoroalkane or fluoroarene, q is 0 and d is 1. In further embodiments, $G^1$ is selected from tetrafluorophenylene and polyfluoro($C_1$-$C_6$)alkyl and D is selected from $SO_2$-tetrafluorophenylene and $SO_2$-polyfluoro($C_1$-$C_6$)alkyl.

In some embodiments of the invention, O-$G^2$-O is chosen from:

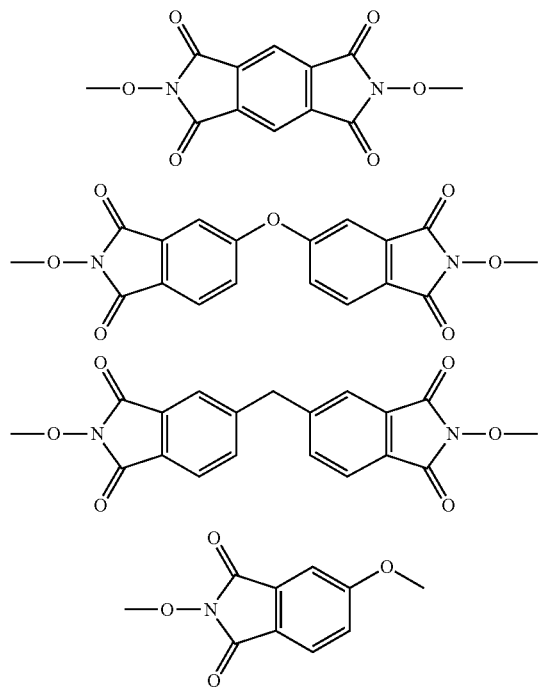

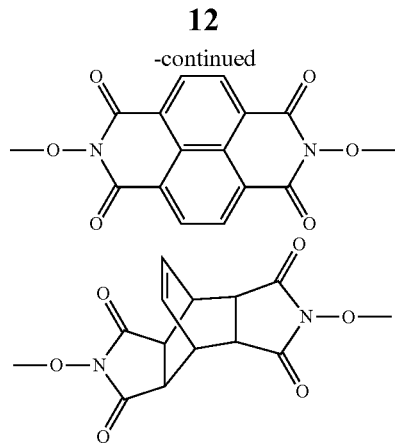

-continued

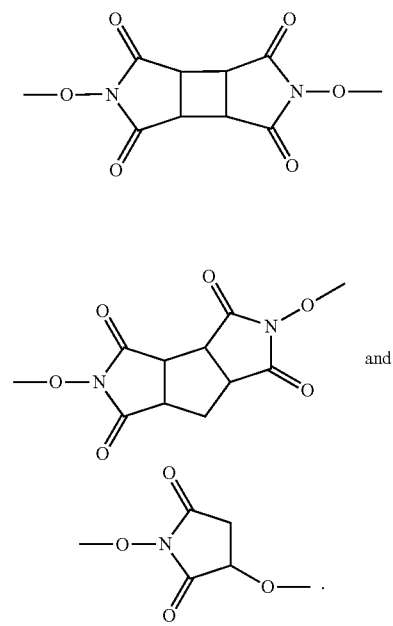

and

In other embodiments of the invention, the —O-$G^2$-O— of Structure I is replaced by $G^6$, as shown below:

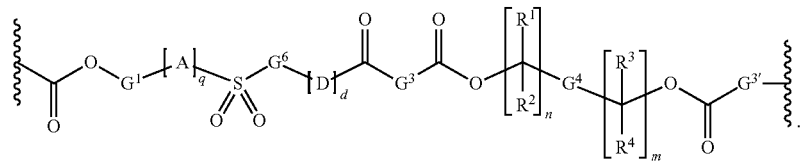

In these embodiments, $G^6$ is represented by one of the following structures:

-continued

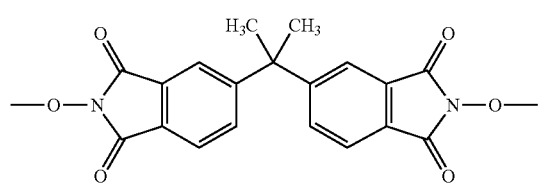

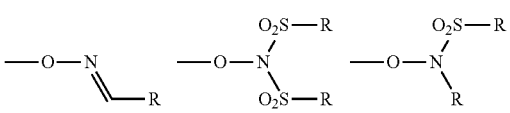

-continued

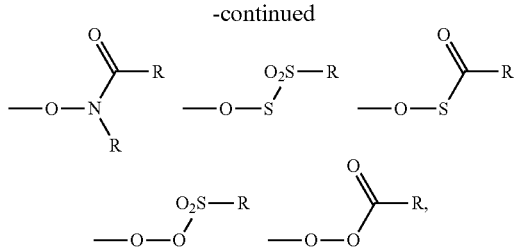

with R representing a residue that furnishes a second hydroxyl. In some embodiments, R is a $C_1$-$C_{20}$ hydrocarbon substituted with a hydroxyl.

In some embodiments of the invention $G^3$ and $G^{3'}$ are chosen independently from —$CH_2$—, —$CH_2CH_2$—, —$CH_2CH_2CH_2$—, —$CH_2CH_2CH_2CH_2$—, —CH=CH—, —C(=$CH_2$)$CH_2$—, —C($CH_3$)$_2$—, —C(Et)$_2$-, o-phenylene, m-phenylene, p-phenylene and bicyclo[2.2.1]heptan-2,3-diyl.

In some embodiments $G^4$ is chosen from a direct bond, —$CH_2$— and —$CH_2CH_2$— and $R^1$, $R^2$, $R^3$ and $R^4$ are methyl. In other embodiments, $G^4$ is chosen from a direct bond, —$CH_2$— and —$CH_2CH_2$—; n is 0; and $R^3$ and $R^4$ are methyl. In still other embodiments, $G^4$ is chosen from a direct bond, —$CH_2$— and —$CH_2CH_2$—; m is 0; and $R^1$ and $R^2$ are methyl. In yet other embodiments

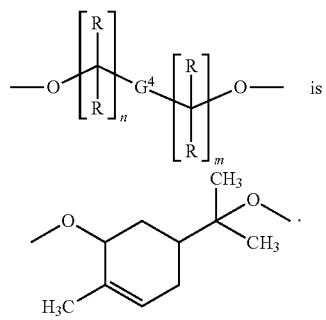

is

This is an example of a residue in which $R^1$ is H, $R^3$ and $R^4$ are $C_1$-$C_8$ hydrocarbons and $R^2$ is a $C_1$-$C_8$ hydrocarbon such that heterolytic cleavage of the oxygen-carbon bond adjacent $R^2$ produces a carbocation that is more stable than a secondary alkyl carbonium ion. Other possibilities for $R^2$ include phenyl or substituted phenyl (producing a benzyl cation) and alkenyl (furnishing an allyl cation).

In some embodiments of the invention, the polymer additionally comprises repeating units of Structure III:

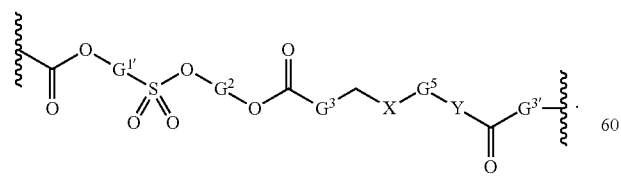

III

In some of these embodiments, $G^{1'}$ is fluoroalkane. In other embodiments, $G^{1'}$ is fluoroarene.

In some of these embodiments, $G^5$ is a $C_2$-$C_{20}$ hydrocarbon. In other embodiments, $G^5$ is a heterocycle. In still other embodiments, $G^5$ is an azaalkane. In yet other embodiments, $G^5$ is an oxaalkane. In still other embodiments, $G^5$ is a phenolic residue. Any of these $G^5$ substituent choices may be substituted with from one to four substituents chosen from oxo, hydroxy and acetyl.

In some embodiments of the invention represented by Structure III, X and Y are chosen independently from nitrogen and oxygen. Examples of the —X-$G^5$-Y— residue include:

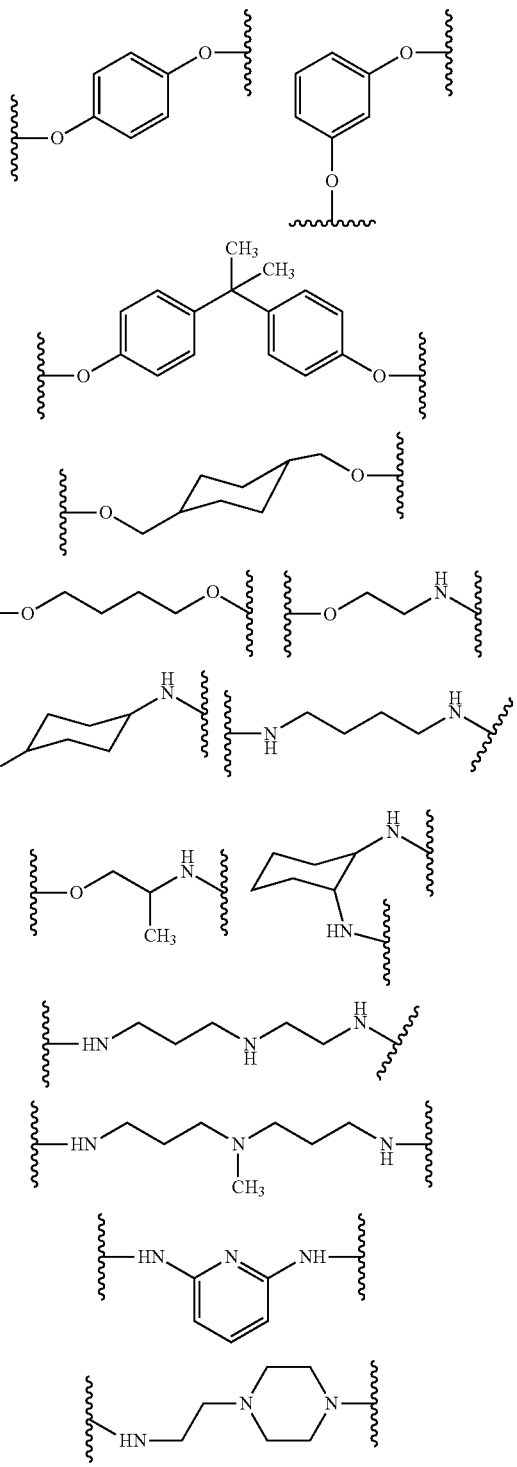

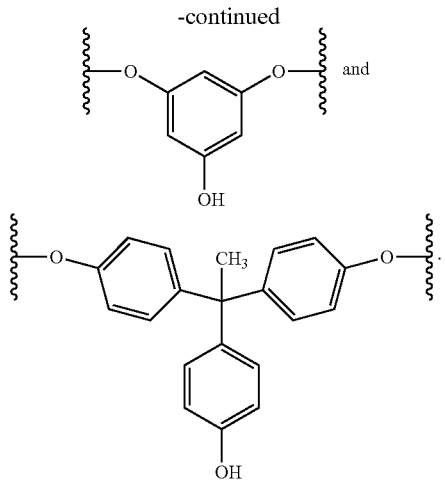

Throughout this specification the terms and substituents retain their definitions.

Alkyl is intended to include linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s- and t-butyl and the like. Preferred alkyl groups are those of $C_{20}$ or below. Cycloalkyl is a subset of alkyl and includes cyclic hydrocarbon groups of from 3 to 8 carbon atoms. Examples of cycloalkyl groups include c-propyl, c-butyl, c-pentyl, norbornyl and the like.

$C_1$ to $C_{20}$ Hydrocarbon includes alkyl, cycloalkyl, polycycloalkyl, alkenyl, alkynyl, aryl and combinations thereof. Examples include benzyl, phenethyl, cyclohexylmethyl, camphoryl and naphthylethyl. The term "carbocycle" is intended to include ring systems consisting entirely of carbon but of any oxidation state. Thus ($C_3$-$C_{10}$) carbocycle refers to such systems as cyclopropane, benzene and cyclohexene; ($C_8$-$C_{12}$) carbopolycycle refers to such systems as norbornane, decalin, indane and naphthalene.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like. Loweralkoxy refers to groups containing one to four carbons. Methoxy is preferred. For the purpose of this application, alkoxy and lower alkoxy include methylenedioxy and ethylenedioxy.

Oxaalkane or oxaalkyl refers to alkyl residues in which one or more carbons has been replaced by oxygen. Examples include methoxypropoxy, 3,6,9-trioxadecyl and the like. Azaalkane or azaalkyl refers to alkyl residues in which one or more carbons has been replaced by nitrogen. Examples include ethylaminoethyl; 1,3,8-triazaoctane; 5-methyl-1,5,9-triazanonane and 1,5-diazabicyclo[4.3.0]nonane.

Heterocycle means a cycloalkyl or aryl residue in which from one to three carbons is replaced by a heteroatom selected from the group consisting of N, O and S. The nitrogen and sulfur heteroatoms may optionally be oxidized, and the nitrogen heteroatom may optionally be quaternized. It is to be noted that heteroaryl is a subset of heterocycle in which the heterocycle is aromatic.

Aryl and heteroaryl mean a 5- or 6-membered aromatic or heteroaromatic ring containing 0-3 heteroatoms selected from O, N, or S; a bicyclic 9- or 10-membered aromatic or heteroaromatic ring system containing 0-3 heteroatoms selected from O, N, or S; or a tricyclic 13- or 14-membered aromatic or heteroaromatic ring system containing 0-3 heteroatoms selected from O, N, or S.

Substituted alkyl, aryl, cycloalkyl, heterocyclyl etc. refer to alkyl, aryl, cycloalkyl, or heterocyclyl wherein up to three H atoms in each residue are replaced with halogen, haloalkyl, hydroxyl, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy.

The term "halogen" means fluorine, chlorine, bromine or iodine.

Terminology related to "protecting", "deprotecting" and "protected" functionalities occurs throughout this application. Such terminology is well understood by persons of skill in the art and is used in the context of processes which involve sequential treatment with a series of reagents. In that context, a protecting group refers to a group which is used to mask a functionality during a process step in which it would otherwise react, but in which reaction is undesirable. The protecting group prevents reaction at that step, but may be subsequently removed to expose the original functionality. The removal or "deprotection" occurs after the completion of the reaction or reactions in which the functionality would interfere. Thus, when a sequence of reagents is specified, as it is in the processes of the invention, the person of ordinary skill can readily envision those groups that would be suitable as "protecting groups".

In the case of the present invention, the functionalities that must be protected include carboxylic acids and alcohols and occasionally amines. Suitable groups for that purpose are discussed in standard textbooks in the field of chemistry, such as *Protective Groups in Organic Synthesis* by T. W. Greene and P. G. M. Wuts [John Wiley & Sons, New York, 1999], which is incorporated herein by reference.

While various diacid chlorides and tertiary diols can be obtained commercially, the PAG-diols for the most part require synthesis. The synthesis of one possible PAG-diol is shown in Scheme 1. A number of other possible PAG-diol molecules are shown in Table 1. The use of this PAG-diol in the synthesis of a $CSP^3$ polymer is illustrated in Scheme 2.

Scheme 1

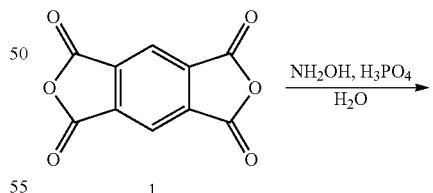

1

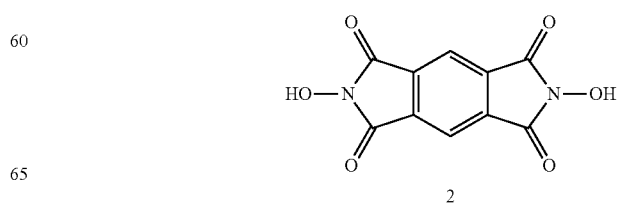

2

17
-continued
18
-continued
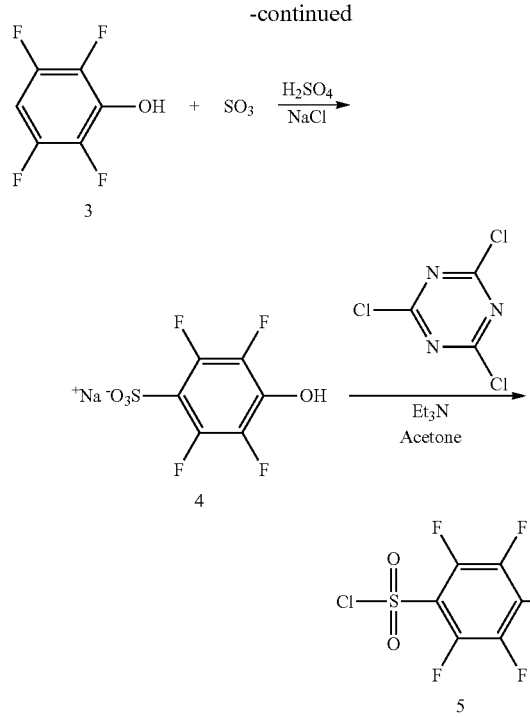
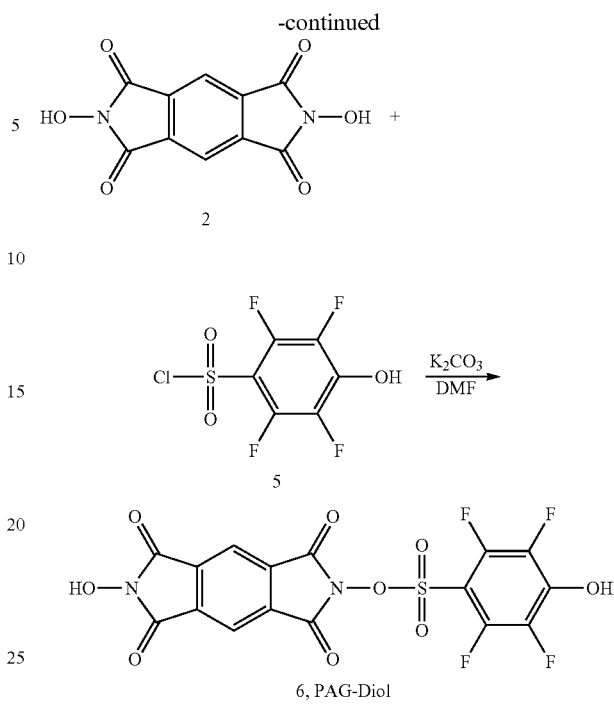
TABLE 1
PAG-Diols for EUV Resists:
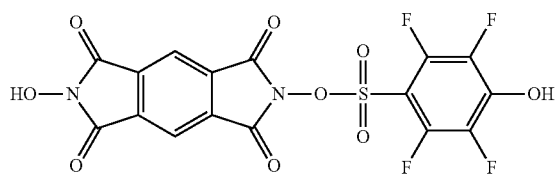 [SMILES: O=c1c2cc3c(=O)n(OS(=O)(=O)c4c(F)c(F)c(O)c(F)c4F)c(=O)c3cc2c(=O)n1O]
6
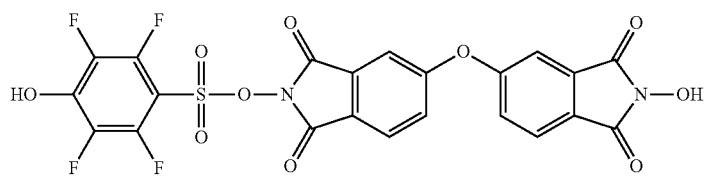 [SMILES: O=C1c2ccc(Oc3ccc4c(c3)C(=O)N(OS(=O)(=O)c3c(F)c(F)c(O)c(F)c3F)C4=O)cc2C(=O)N1O]
7
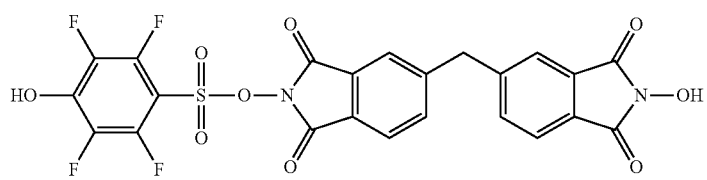 [SMILES: O=C1c2ccc(Cc3ccc4c(c3)C(=O)N(OS(=O)(=O)c3c(F)c(F)c(O)c(F)c3F)C4=O)cc2C(=O)N1O]
8
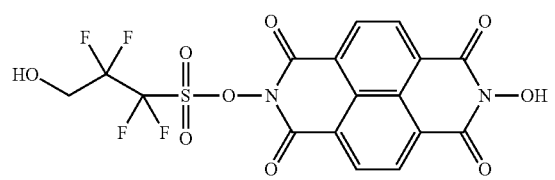 [SMILES: O=C1c2ccc3c4c(ccc(c24)C(=O)N1O)C(=O)N(OS(=O)(=O)C(F)(F)C(F)(F)CO)C3=O]
9

TABLE 1-continued
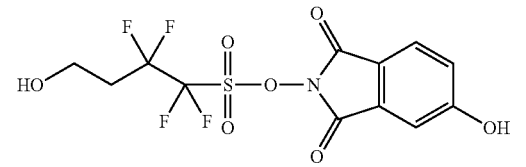 [SMILES: O=C1c2ccc(O)cc2C(=O)N1OS(=O)(=O)C(F)(F)C(F)(F)CCO]
10
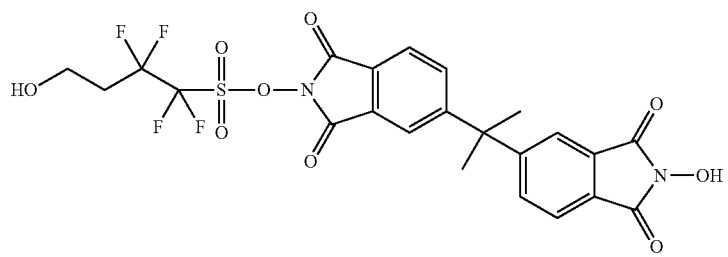 [SMILES: CC(C)(c1ccc2c(c1)C(=O)N(O)C2=O)c1ccc2c(c1)C(=O)N(OS(=O)(=O)C(F)(F)C(F)(F)CCO)C2=O]
11
PAG-Diols for EUV or 193 nm Resists:
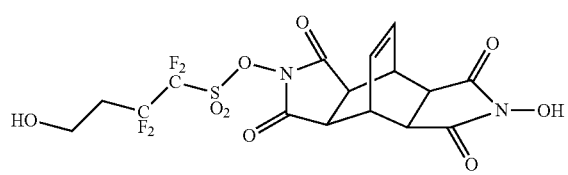 [SMILES: O=C1C2C3C=CC(C2C(=O)N1O)C1C(=O)N(OS(=O)(=O)C(F)(F)C(F)(F)CCO)C(=O)C31]
12
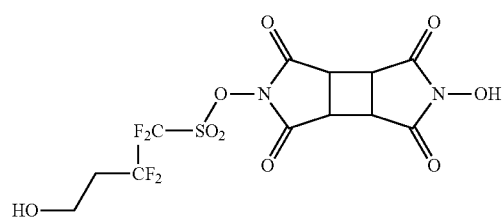
13
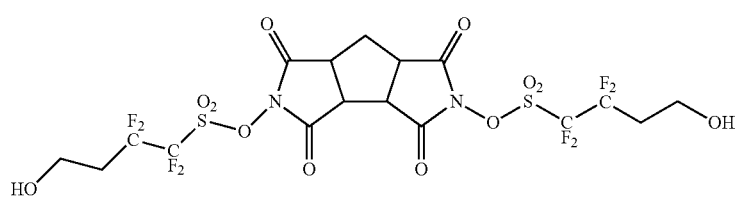 [SMILES: O=C1C2CC3C(=O)N(OS(=O)(=O)C(F)(F)C(F)(F)CCO)C(=O)C3C2C(=O)N1OS(=O)(=O)C(F)(F)C(F)(F)CCO]
14
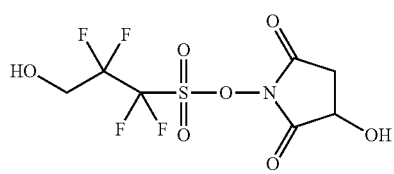 [SMILES: O=C1CC(O)C(=O)N1OS(=O)(=O)C(F)(F)C(F)(F)CO]
15
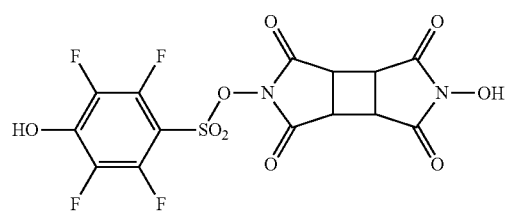 [SMILES: O=C1C2C(C(=O)N1O)C1C(=O)N(OS(=O)(=O)c3c(F)c(F)c(O)c(F)c3F)C(=O)C21]
16

TABLE 1-continued
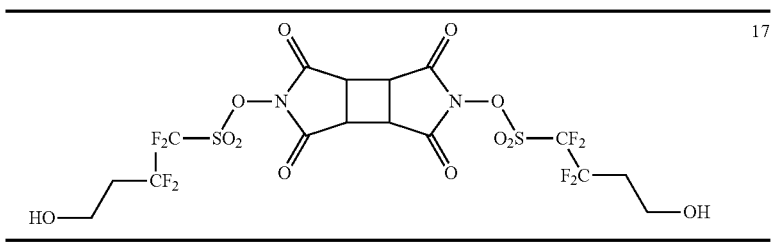
17
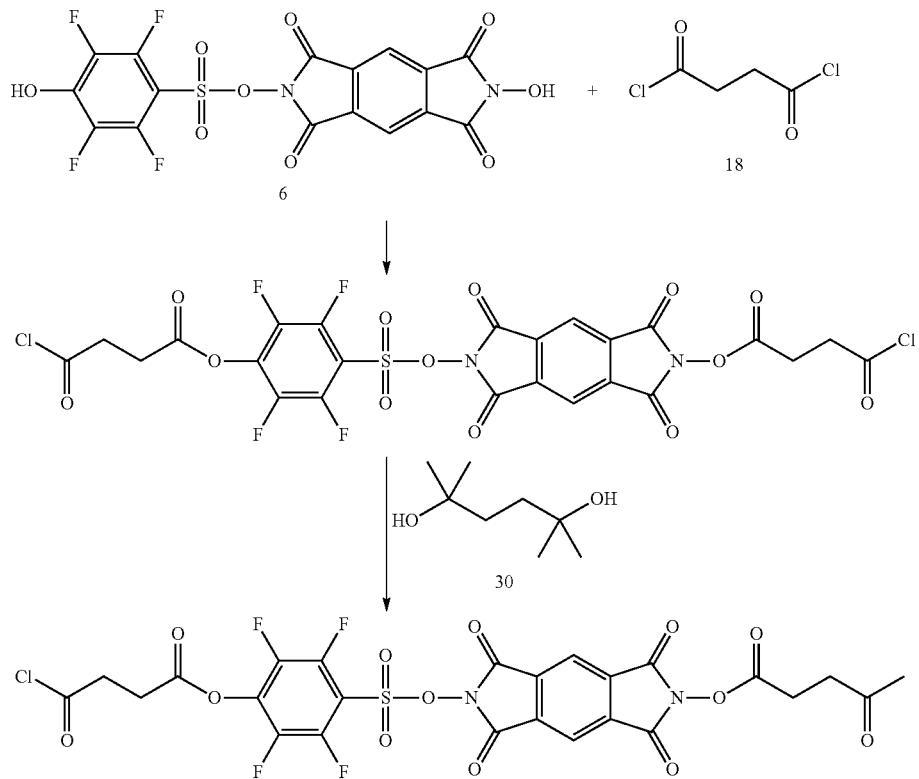
Scheme 2
A number of Chain-Scission Polyester PAG-Polymers can be synthesized using numerous combinations of commercially available diacid chlorides and tertiary diols. Some of the diacid chlorides and tertiary diols that can be obtained commercially are outlined in the Tables 2 and 3, respectively.
TABLE 2
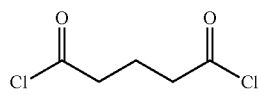
18
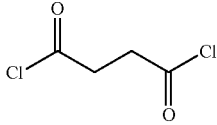
19
TABLE 2-continued
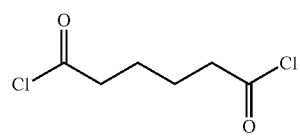
20
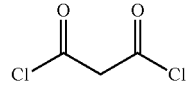
21

TABLE 2-continued

| | |
|---|---|
| 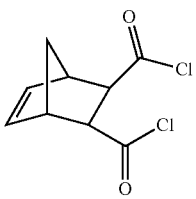 [SMILES: O=C(Cl)C1C2C=CC(C2)C1C(=O)Cl] | 22 |
| 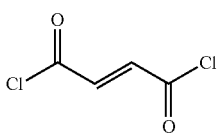 | 23 |
| 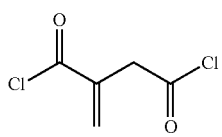 | 24 |
| 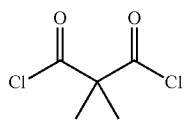 | 25 |
| 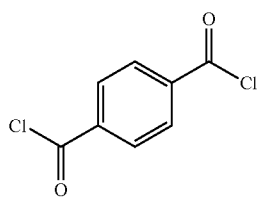 [SMILES: O=C(Cl)c1ccc(C(=O)Cl)cc1] | 26 |
| 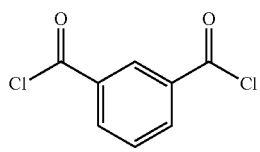 [SMILES: O=C(Cl)c1cccc(C(=O)Cl)c1] | 27 |
| 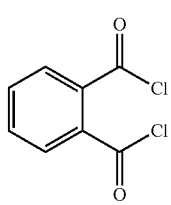 [SMILES: O=C(Cl)c1ccccc1C(=O)Cl] | 28 |
| 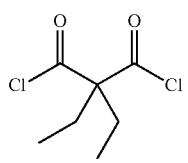 | 29 |
| 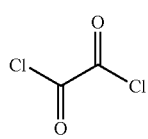 | 72 |

TABLE 3

| | |
|---|---|
| 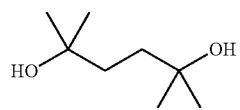 | 30 |
| 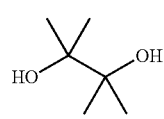 | 31 |
|  | 32 |
| 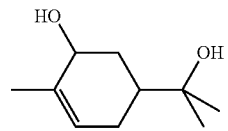 | 33 |
| 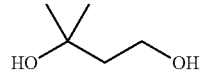 | 70 |

Step-growth polymers are well known and are of great commercial importance. Nylon and PET are high volume examples. Novolak polymers used in I-line resists are also step-growth polymers. Since I-line, however, nearly all of the polymers used in photoresists have been free-radical chain-growth polymers such as those used in the preparation of DUV, 193 nm and EUV photoresists. One of the advantageous characteristics of step-growth polymerization is that the high molecular weight polymers are not created until the end of the polymerization reaction. Since many of the features of CSP$^3$ depend upon the reduction of molecular weight upon photolysis, it is advantageous to prepare CSP$^3$ polymers with molecular weights of 10,000 g/mol or greater.

Many commercially successful step-growth polyesters are prepared directly from dicarboxylic acids and diols at high temperatures. In the case of CSP$^3$ polymers, however, it is preferred to conduct polymerizations at temperatures less than about 40° C. to minimize thermal decomposition of the PAG functionality. Reacting diacid chlorides with diols is typically considered "overkill" for high volume polyester production, however, for CSP$^3$ synthesis with tertiary alcohols, moderate temperatures are desirable. To accomplish this, one may convert the tertiary diols to tertiary dialkoxides by reaction with n-BuLi prior to reaction with the diacid chlorides (Scheme 3). These reactions are quite exothermic so that they need to be conducted at controlled temperature to give high yields. An additional feature of this approach is that the by-product of this reaction (LiCl) is easier to remove than pyridine or triethylamine.

Scheme 3

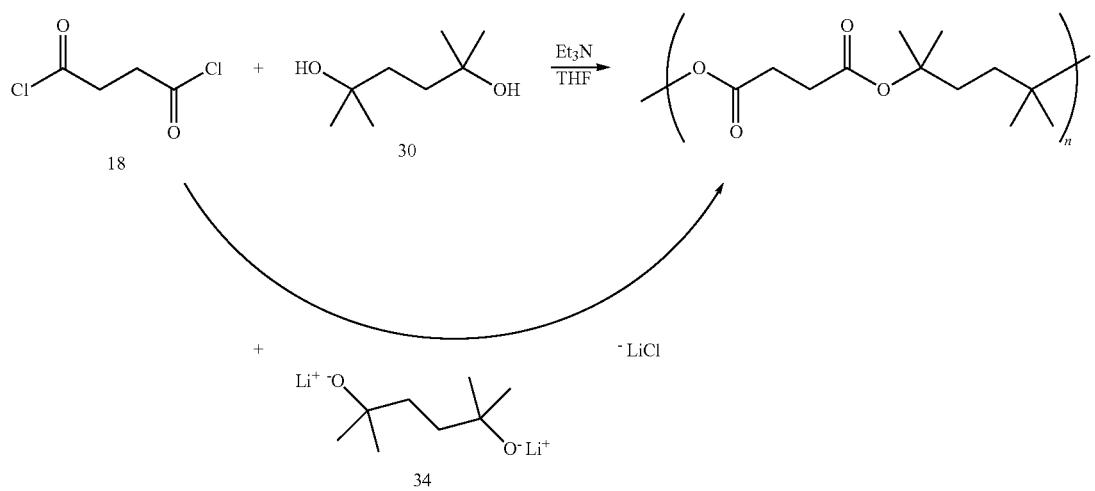

One approach for linking low molecular weight oligomers together at the end of the polymerization is to add unhindered diols, diphenols or diamines such as molecules 35-44 in Table 4. Although these linkages are inactive toward acidolysis, they provide an additional method for building molecular weight since they are more reactive than the tertiary diols toward acid chlorides. Unhindered trifunctional monomers can also be added at the end of the reaction to build molecular weight. In particular, molecules 45-47 can be used to link oligomers together. Trifunctional monomers are also interesting because they can react twice and leave desirable unreacted functional groups such as phenols (adhesion) or amines (quencher base). Compounds 48-50 have tertiary amines that will not react with acid chlorides, so will add quencher base to the polymer. With both acids and bases covalently attached to polymers, image blur due to diffusion will be at minimum.

Trace amounts of water present during the $CSP^3$ polymerization could limit molecular weight by converting acid chlorides to the much less reactive carboxylic acids. To counteract this problem, one can use activating agents 51-53 shown in Table 5. These compounds could be used to couple carboxylic acids and alcohols together to form esters.

TABLE 4

Difunctional Molecules for Mw Build:

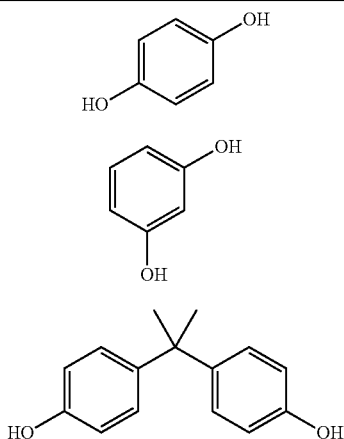

TABLE 4-continued

| | |
|---|---|
| HO~~~OH | 38 |
| HO-CH2-cyclohexyl-CH2-OH | 39 |
| H2N~~OH | 40 |
| H2N~~~NH2 | 41 |
| H2N-cyclohexyl-NH2 | 42 |
| cyclohexyl(NH2)2 | 43 |
| H2N-CH2-CH(NH2)-CH3 | 44 |

Trifunctional Molecules for Mw Build:

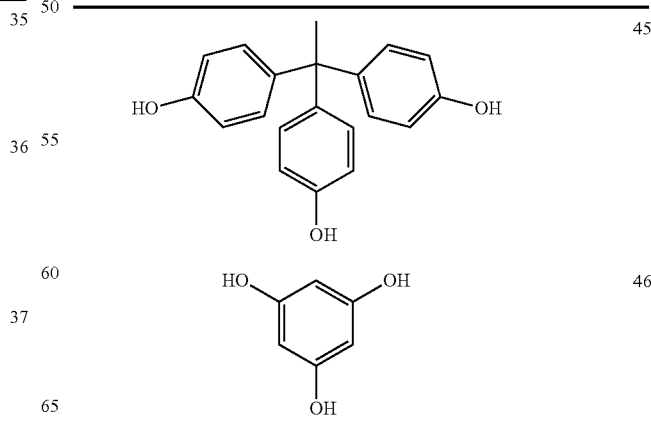

TABLE 4-continued

| | |
|---|---|
| H₂N―⁀⁀―NH―⁀⁀―NH₂ | 47 |
| Two reactive sites, that will leave base functionality in polymer chain. | |
| H₂N―⁀⁀―N(CH₃)―⁀⁀―NH₂ | 48 |
| H₂N―(pyridine)―NH₂ | 49 |
| H₂N―⁀⁀―N(piperazine)NH | 50 |

TABLE 5

| Activating Agents | |
|---|---|
| 1,1-Carbonyldiimidazole | 51 |
| DPCP | 52 |
| DCC | 53 |

Synthetic routes for preparation of PAG-diols are shown below.

2,3,5,6-Tetrafluorophenol 3 is readily sulfonated with sulfuric acid at ambient temperatures and the sulfonated compound is precipitated from water as the sodium sulfonate salt 4. [(a) EP 1085013, 21 Mar. 2001. (b) Gee et al. Tetrahedron Letters (1999), 40(8), 1471-1474. (c) Grzegorz Blotny, Tetrahedron Letters (2003), 44, 1499-1501.]The sodium sulfonate salt 4 is converted to its sulfonyl chloride 5 using 2,4,6-trichloro-1,3,5-triazine as chlorinating agent under neutral conditions. The hydroxyl sulfonyl chloride 5, thus obtained is reacted with N,N'-dihydroxy pyromellitimide using potassium carbonate in dimethylformamide to form the PAG-Diol 6. [See US published application US2003/0064315]

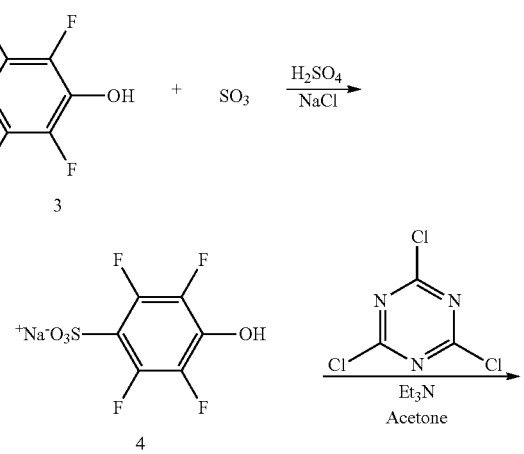

Scheme 4

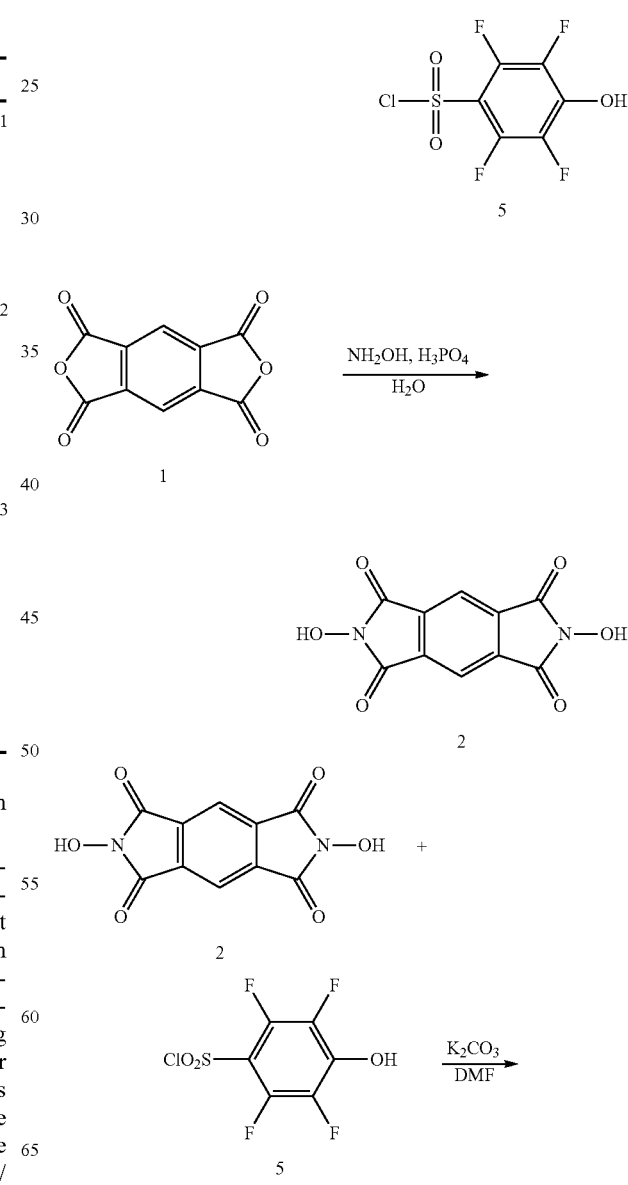

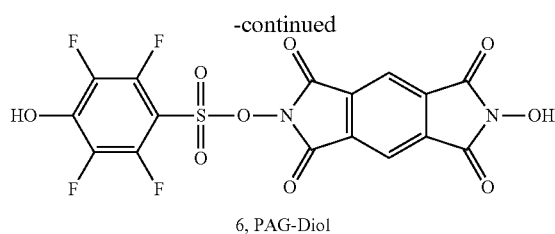

6, PAG-Diol

The PAG-Diol 6 is reacted with various diacid chlorides and diols to form polyester PAG-polymers. One such specific example is its reaction with succinyl dichloride 18, to form an intermediate diacid chloride (Scheme 5). This diacid chloride is reacted with the diol 30 to form the Chain Scission Polyester PAG-polymer (CSP$^3$).

PAG-Diols can also be synthesized as described in Scheme 6 for 12.

Bicyclo[2.2.2]oct-7-ene-2,3,5,6-tetracarboxylic dianhydride is treated with hydroxylamine hydrochloride in presence of pyridine to provide the corresponding bisimide. [See PCT WO 2003/045915] The sulfonyl chloride, obtained from the lithium salt of 1,1,2-trifluoro-4-hydroxy-1-butanesulfonate, is reacted with the bisimide under basic conditions to obtain the PAG-diols.

Scheme 5

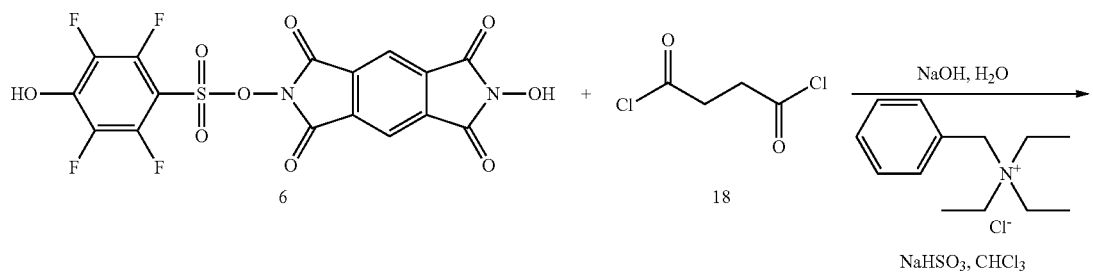

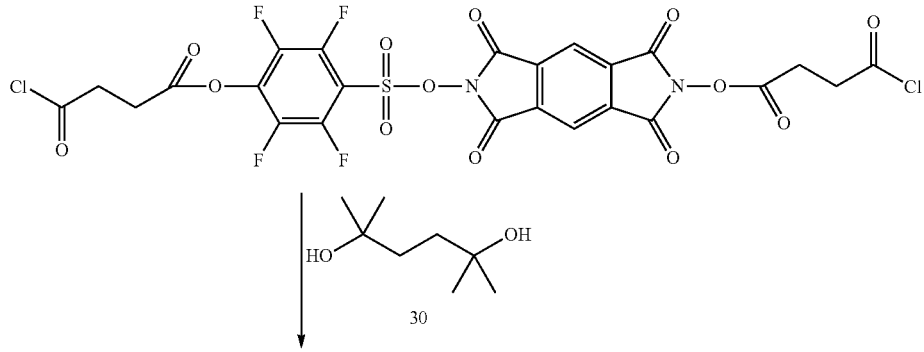

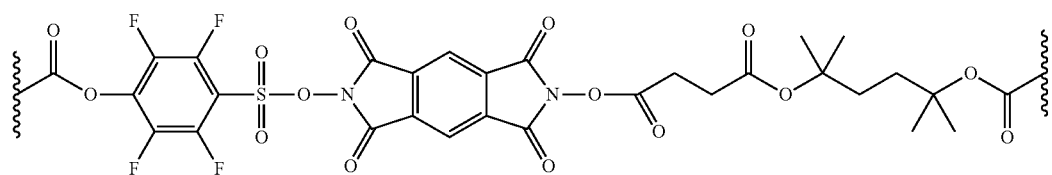

EXAMPLE 1

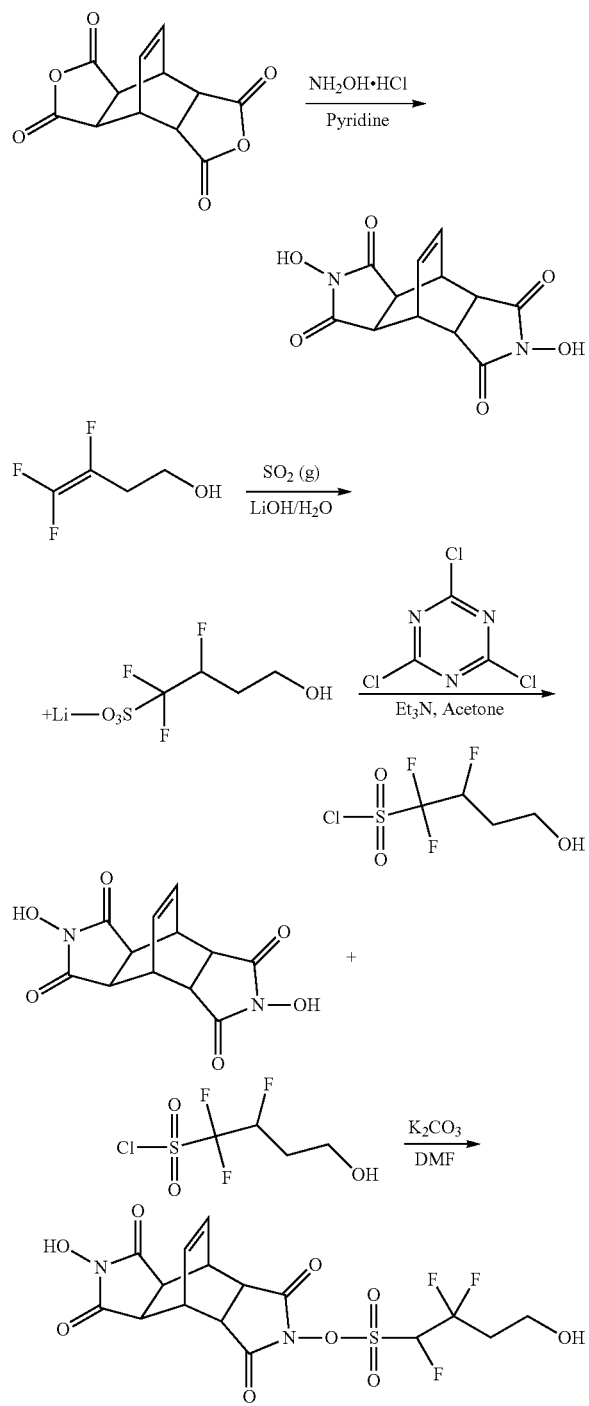

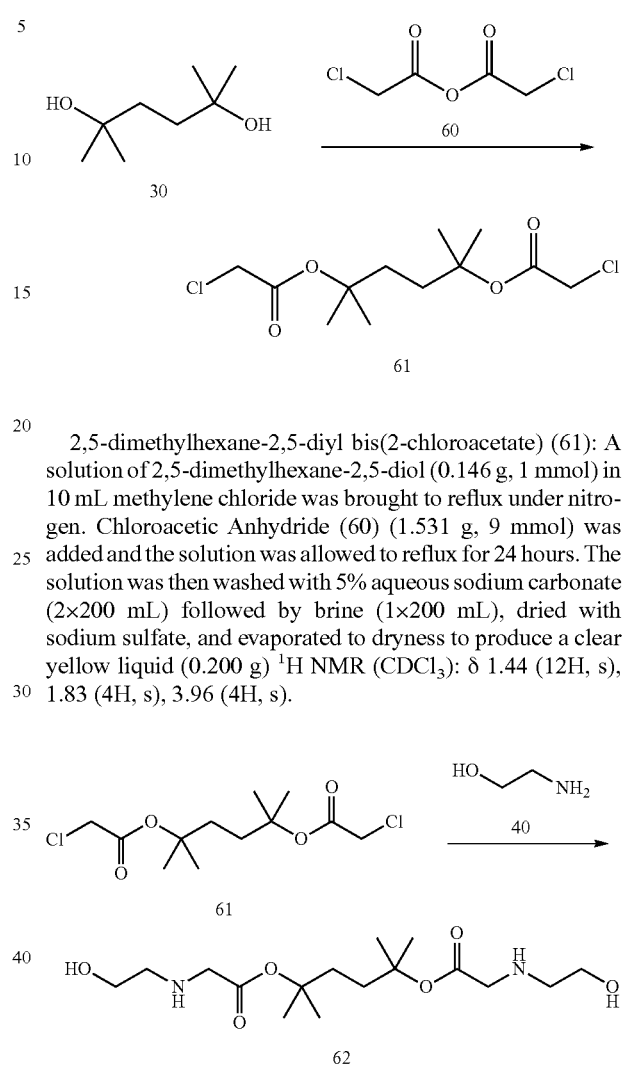

2,5-dimethylhexane-2,5-diyl bis(2-chloroacetate) (61): A solution of 2,5-dimethylhexane-2,5-diol (0.146 g, 1 mmol) in 10 mL methylene chloride was brought to reflux under nitrogen. Chloroacetic Anhydride (60) (1.531 g, 9 mmol) was added and the solution was allowed to reflux for 24 hours. The solution was then washed with 5% aqueous sodium carbonate (2×200 mL) followed by brine (1×200 mL), dried with sodium sulfate, and evaporated to dryness to produce a clear yellow liquid (0.200 g) $^1$H NMR (CDCl$_3$): δ 1.44 (12H, s), 1.83 (4H, s), 3.96 (4H, s).

2,5-dimethylhexane-2,5-diyl bis(2-(2-hydroxyethylamino)acetate) (62): To a solution of compound (61) (0.898 g, 3 mmol) in 5 ml, of methylene chloride at 0° C., ethanolamine (40) (2.504 g, 41 mmol) was added drop wise over the course of one hour. The solution was then allowed to warm to 20° C. and stirred for 18 hours. On completion, the reaction was diluted with CH$_2$Cl$_2$ (15 mL) and washed with brine (1×20 mL) and dried. The solvent was evaporated to get clear yellow oil. (0.380 g) $^1$H NMR (400 MHz, CDCl$_3$): δ 1.35 (s, 12H), 1.79 (s, 4H), 2.68-2.71 (t, J=5.1, 4H), 3.08 (b, 4H), 3.26 (s, 4H), 3.58-3.60 (t, J=5.1, 4H).

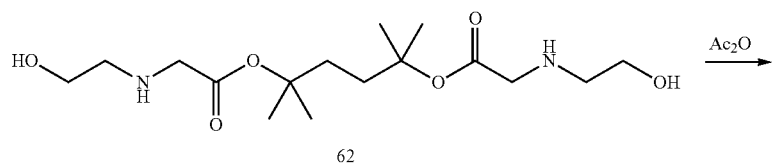

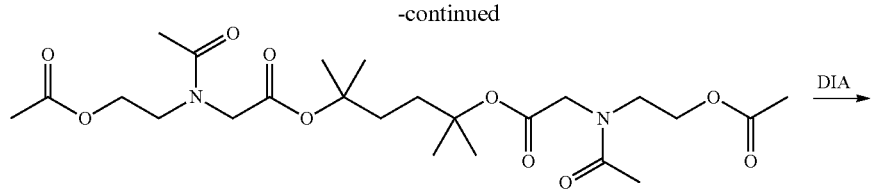

63

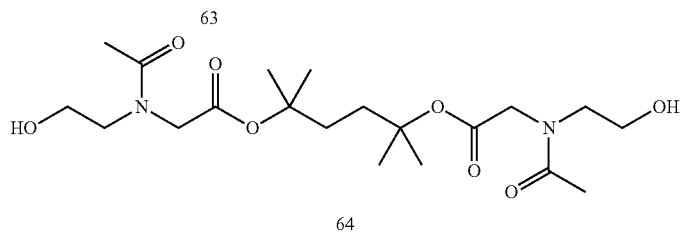

64

2,5-dimethylhexane-2,5-diyl bis(2-(N-(2-hydroxyethyl) acetamido)acetate) (64): The cleavable diol is made in the following manner. Compound (62) is reacted with excess acetic anhydride in methylene chloride, pyridine and 4-dimethylaminopyridine at room temperature followed by an aqueous workup to yield 2,5-dimethylhexane-2,5-diyl bis(2-(N-(2-hydroxyethyl)acetamido)acetate) (63). The primary acetate is then removed by reacting (63) with diisopropylamine in methylene chloride. The solution is then reduced at high vacuum to yield 2,5-dimethylhexane-2,5-diyl bis(2-(N-(2-hydroxyethyl)acetamido)acetate) (64).

EXAMPLE 2

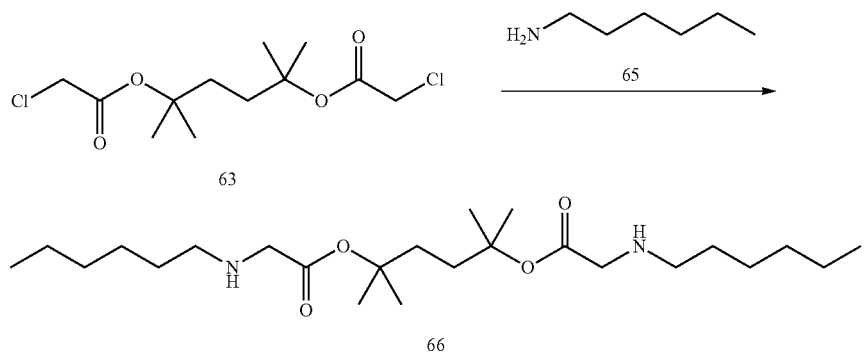

2,5-dimethylhexane-2,5-diyl bis(2-(hexylamino)acetate) (66): The cleavable diol is made by the following manner. Compound (61) is reacted with 5 equivalents of 1-aminohexane (65) in methylene chloride. Wash with brine and dry to yield 2,5-dimethylhexane-2,5-diyl bis(2-(hexylamino)acetate) (66).

EXAMPLE 3

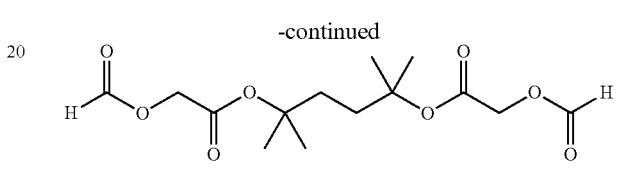

68

2,5-dimethylhexane-2,5-diyl bis(2-(formyloxy)acetate) (68): Formic acid (67) (0.921 g, 20 mmol) and triethylamine (2.226 g, 22 mmol) were combined and stirred for 30 minutes. Compound (61) (0.299 g, 1 mmol) was then added and stirred for three days. The solution was dissolved in 10 mL of ethyl acetate and the precipitate was filtered and washed with 10 mL diethylether. The combined filtrate was then washed with brine and dried with sodium sulfate. The solvent was evaporated to get dark brown viscous oil. $^1$H NMR (400 MHz, CDCl$_3$): δ 1.44 (s, 12H), 1.80 (s, 4H), 4.57 (s, 4H), 8.11 (s, 2H).

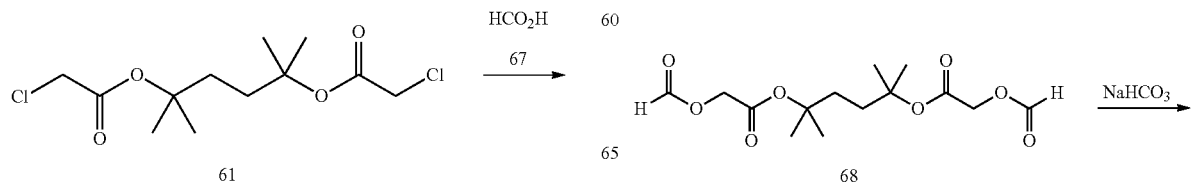

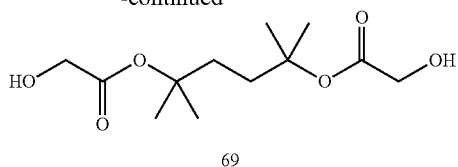

69

2,5-dimethylhexane-2,5-diyl bis(2-hydroxyacetate)[1] (69): The crude product (68) was combined with aqueous sodium bicarbonate solution (20 mL, 0.75 N) and stirred for 3 days. The compound was then removed from the aqueous phase using continuous distillation in ether overnight. The organic phase was then evaporated to get a white solid. (0.032 g) $^1$H NMR (400 MHz, CDCl$_3$): δ 1.36 (s, 12H), 1.84 (s, 4H), 3.41 (b, 2H), 4.00 (s, 4H).

EXAMPLE 4

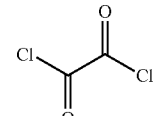

70      71

3-hydroxy-3-methylbutyl acetate (71): A solution of 16 mL 3-methylbutane-1,3-diol in 10 mL methylene chloride with a catalytic amount of 4-dimethylpyridine was cooled to 0° C. Acetic anhydride (4.084 g, 40 mmol) was then added drop wise and the solution was stirred for 5 hours. An additional 10 mL of methylene chloride was added and the solution was washed with 10% aqueous ammonium chloride (2×20 mL), 5% sodium carbonate (2×20 mL) and brine (1×20 mL), dried over sodium sulfate and evaporated to dryness to yield a clear, yellow liquid. (2.402 g) $^1$H NMR (400 MHz, CDCl$_3$): δ 1.24 (s, 6H), 1.56 (b, 1H), 1.80-1.83 (t, J=6.8, 2H), 2.02 (s, 3H), 4.22 (t, J=6.9, 2H).

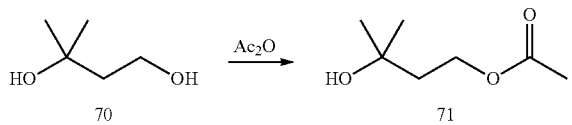

73 bis(4-acetoxy-2-methylbutan-2-yl)oxalate (73): To a solution of compound (71) (0.322 g, 2.2 mmol) in 10 mL pyridine, oxalyl chloride (0.127 g, 1 mmol) was added slowly and the solution was stirred overnight. 20 mL of ethyl acetate was then added and was washed with 10% ammonium chloride (3×20 mL) followed by brine (1×20 mL). The organic layer was then dried over sodium sulfate, evaporated to dryness and the crude product was collected as an oily, white solid. (0.130 g) $^1$H NMR (400 MHz, CDCl$_3$): δ 1.57 (s, 12H), 2.04 (s, 6H), 2.19 (t, J=6.8, 4H), 4.20-4.24 (t, J=6.9, 4H).

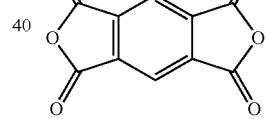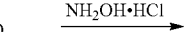

73

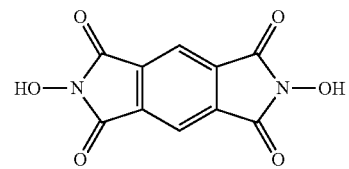

74 bis(4-hydroxy-2-methylbutan-2-yl) oxalate (74): The cleavable diol is made in the following manner. To a solution of compound (73) in methylene chloride, diisopropylamine is added and the solution is stirred until reaction is complete. A standard aqueous workup is done and the diol should remain in the organic phase. Evaporate the solvent and collect bis(4-hydroxy-2-methylbutan-2-yl) oxalate (74).

EXAMPLE 5

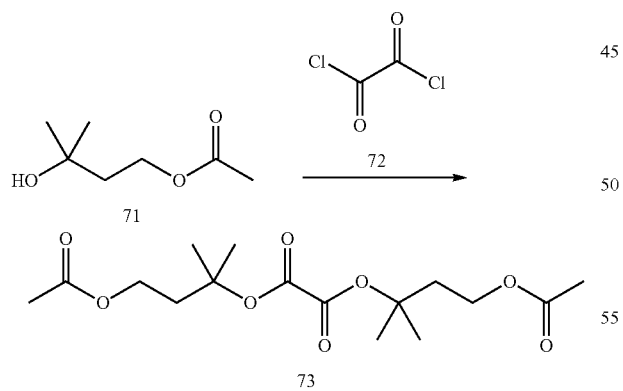

N,N'-Dihydroxypyromellitimide, NDHPI (2): Hydroxylamine hydrochloride (3.18 g, 45.8 mmol) was added to pyridine (25 mL) and stirred at room temperature for 10 mins. A clear solution formed, after which pyromellitic anhydride (1) (5.00 g, 22.9 mmol) was added and the solution was refluxed for overnight at 100° C. To the solid precipitate formed, Conc. HCl (10 mL) was added and the solid was filtered and washed with Cold water. The solid was dried under vacuum. $^1$H NMR (DMSO-$d_6$, 400 MHz): 8.15 (2H, s)

EXAMPLE 6

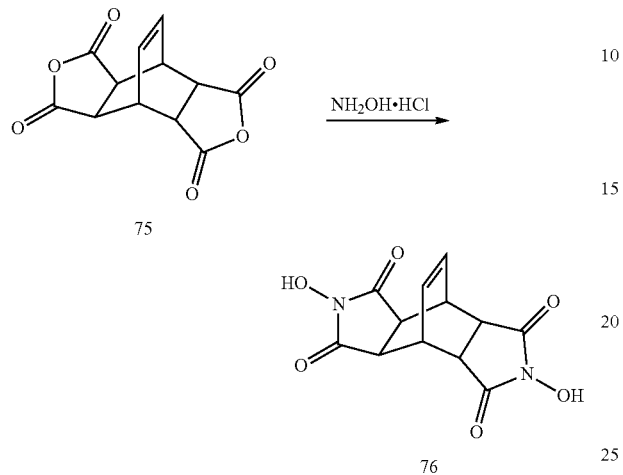

3a,4,4a,7a,8,8a-hexahydro-2,6-dihydroxy-4,8-ethenobenzo[1,2-c:4,5-c']dipyrrole-1,3,5,7(2H,6H)-tetrone (76): The dihydroxy diimide is made in the following manner. Bicycle[2,2,2]oct-7-ene-2,3,5,6-tetracarboxylic dianhydride (75) is reacted with 2 equivalents of hydroxylamine hydrochloride in anhydrous pyridine[2] at 100° C. for 15 hrs. The reaction mixture is quenched with 6% acetic acid to precipitate the product.

EXAMPLE 7

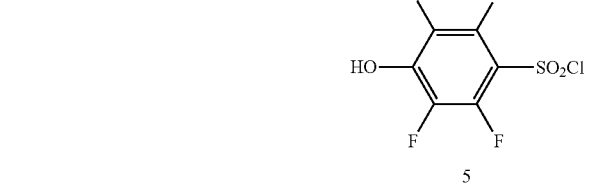

2,3,5,6-tetrafluoro-4-hydroxybenzene-1-sulfonyl chloride (5): The sulfonyl chloride is prepared in the following manner. The sodium salt of 2,3,5,6-tetrafluoro-4-hydroxybenzenesulfonate[3] is converted to its corresponding sulfonyl chloride by reacting with thionyl chloride in catalytic DMF.[4]

EXAMPLE 8

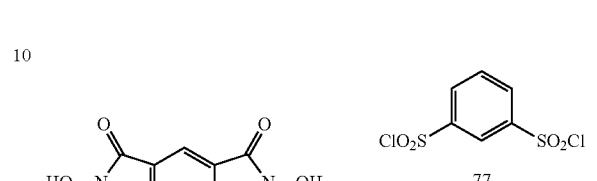

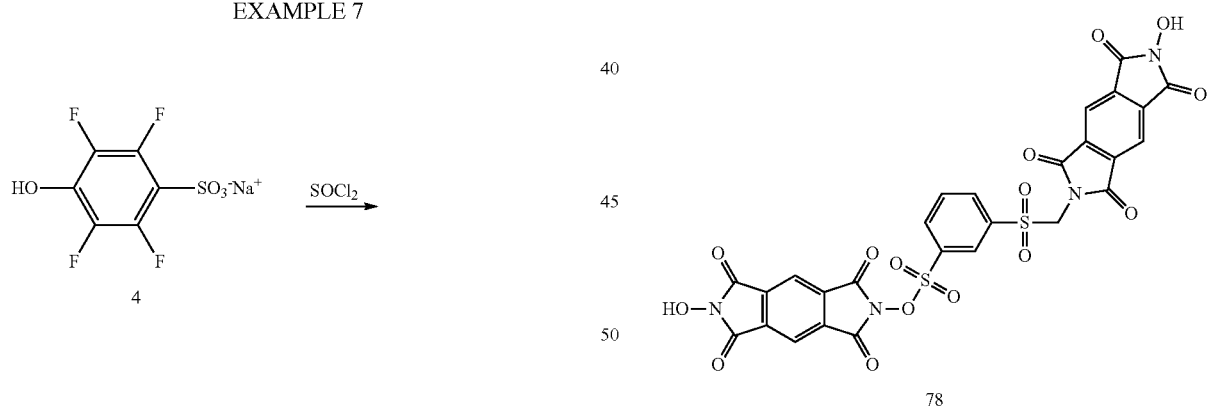

bis(6-hydroxy-1,3,5,7-tetraoxo-6,7-dihydropyrrolo[3,4-f]isoindol-2(1H,3H,5H)-yl)benzene-1,3-disulfonate (78): The PAG-diol is made in the following manner. Two equivalents of N,N'-Dihydroxypyromellitimide (2) is heated with one equivalent of benzene-1,3-disulfonyl dichloride (77) in anhydrous pyridine at 90° C. for 16 hrs. The product, bis(6-hydroxy-1,3,5,7-tetraoxo-6,7-dihydropyrrolo[3,4-f]isoindol-2(1H,3H,5H)-yl)benzene-1,3-disulfonate (78) is obtained upon acidification with 6% acetic acid.[2]

EXAMPLE 9

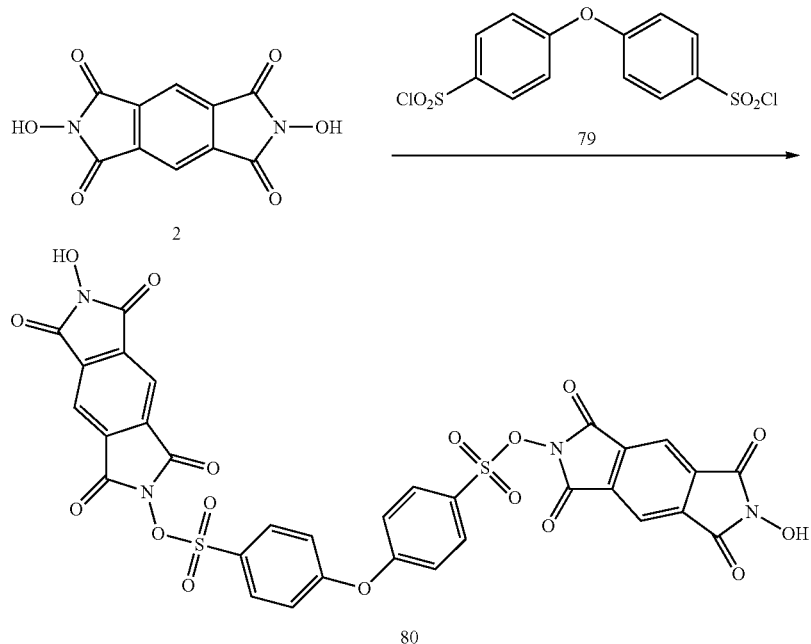

bis(6-hydroxy-1,3,5,7-tetraoxo-6,7-dihydropyrrolo[3,4-f] isoindol-2(1H,3H,5H)-yl)4,4'-oxydibenzenesulfonate (80): The PAG-diol is made in the following manner. Two equivalents of N,N'-Dihydroxypyromellitimide (2), is heated with one equivalent of 4,4'-oxybis(benzenesulfonyl chloride) (79) in presence of anhydrous pyridine at 100° C. for 15 hrs. The product, bis(6-hydroxy-1,3,5,7-tetraoxo-6,7-dihydropyrrolo[3,4-f]isoindol-2(1H,3H,5H)-yl) 4,4'-oxydibenzenesulfonate (80) is obtained on acidification with 6% acetic acid.

EXAMPLE 10

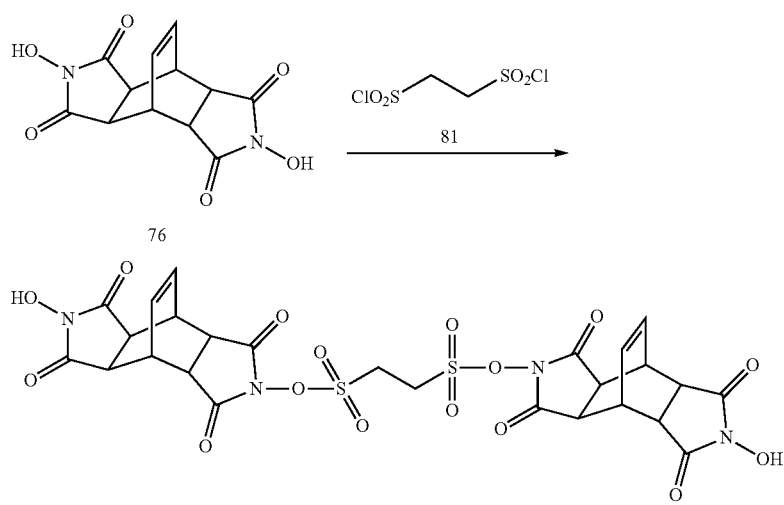

1,2-bis(1,2,4,5-dihydroxyiminebicyclo[2.2.1]heptane)-ethyl sulfonate (82): The PAG-diol is made in the following manner. Two equivalents of N,N'-3a,4,4a,7a,8,8a-hexahydro-2,6-dihydroxy-4,8-ethenobenzo[1,2-c:4,5-c']dipyrrole-1,3,5,7(2H,6H)-tetrone (76), is heated with one equivalent of ethane-1,2-disulfonyl chloride (81) in presence of anhydrous pyridine at 100° C. for 15 hrs. The product, 1,2-bis(1,2,4,5-dihydroxyiminebicyclo[2.2.1]heptane)-ethyl sulfonate (82) is obtained on acidification with 6% acetic acid.

EXAMPLE 11

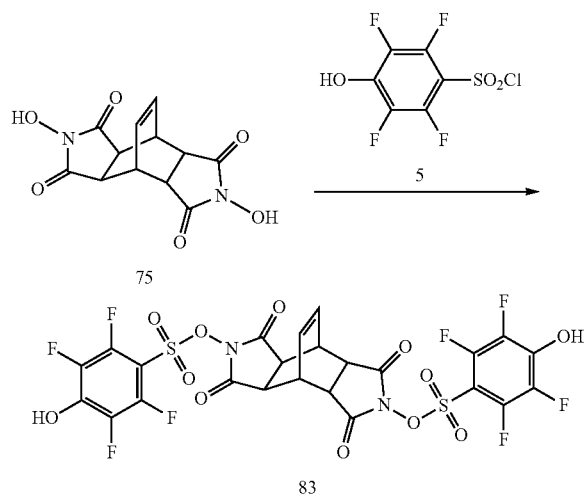

1,2-bis(1,2,4,5-dihydroxyiminebicyclo[2.2.1]heptane)-2,3,5,6-tetrafluoro-4-hydroxybenzene sulfonate (83): The PAG-diol is made in the following manner. One equivalent of N,N'-3a,4,4a,7a,8,8a-hexahydro-2,6-dihydroxy-4,8-ethenobenzo[1,2-c:4,5-c']dipyrrole-1,3,5,7(2H,6H)-tetrone (75), is heated with two equivalents of 2,3,5,6-tetrafluoro-4-hydroxybenzene-1-sulfonyl chloride (5) in presence of anhydrous pyridine at 100° C. for 15 hrs. The product, 1,2-bis(1,2,4,5-dihydroxyiminebicyclo[2.2.1]heptane)-2,3,5,6-tetrafluoro-4-hydroxybenzene sulfonate (83) is obtained on acidification with 6% acetic acid.[2]

Polymerization

EXAMPLE 12

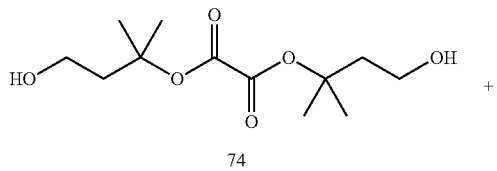

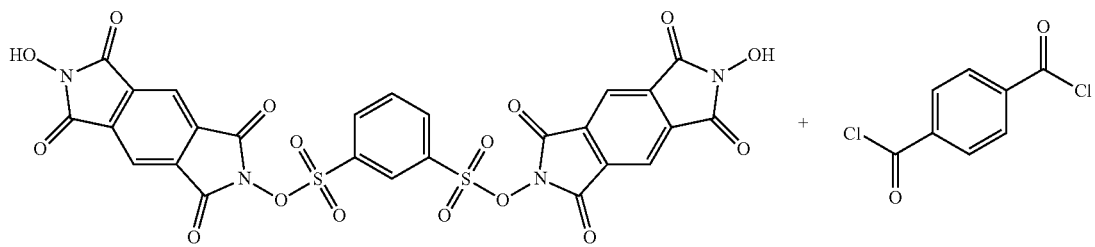

To get the $CSP^3$ polymer, 9 equivalent of the cleavable diol, bis(4-hydroxy-2-methylbutan-2-yl) oxalate (74), 1 equivalent of the PAG diol, bis(6-hydroxy-1,3,5,7-tetraoxo-6,7-dihydropyrrolo[3,4-f]isoindol-2(1H,3H,5H)-yl)benzene-1,3-disulfonate (78), and 10 equivalent of pyridine are combined and dissolved in acetone. A catalytic amount of 1,4-Diazabicyclo[2.2.2]octane and potassium iodide are added and the solution is stirred and warmed to reflux. Over the course of 6 hours, 10 equivalents of terephthaloyl chloride (26) dissolved in acetone are added drop wise using a syringe pump and the solution is allowed to stir for an additional hour. Finally the reaction is quenched with ethylene diamine and precipitated out in water to give the final product.

EXAMPLE 13

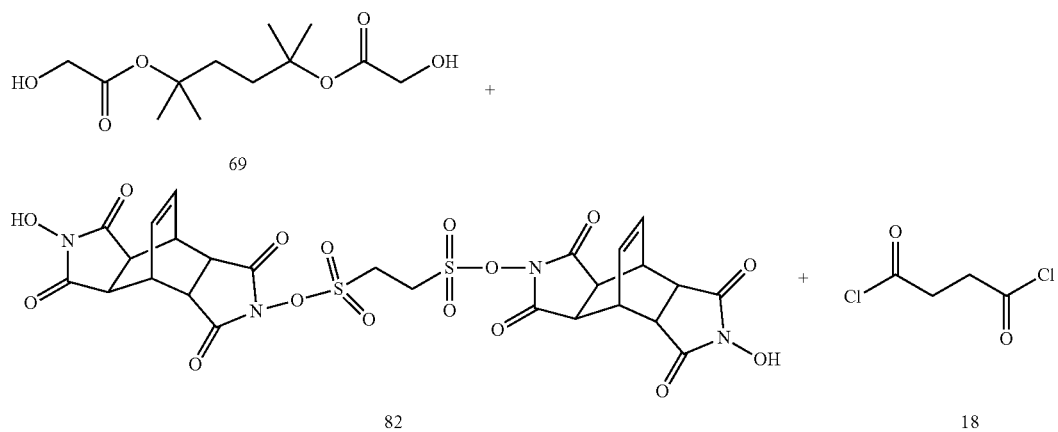

To get the CSP³ polymer, 9 equivalent of the cleavable diol, 2,5-dimethylhexane-2,5-diyl bis(2-hydroxyacetate) (69), 1 equivalent of the PAG diol, 1,2-bis(1,2,4,5-dihydroxy-iminebicyclo[2.2.1]heptane)-ethyl sulfonate (82) and 10 equivalents of pyridine, are combined and dissolved in acetone. A catalytic amount of 1,4-Diazabicyclo[2.2.2]octane and potassium iodide are added and the solution is stirred and warmed to reflux. Over the course of 6 hours, 10 equivalents of succinyl dichloride (18) dissolved in acetone are added drop wise using a syringe pump and the solution is allowed to stir for an additional hour. Finally the reaction is quenched with ethylene diamine and precipitated out in water to give the final product.

In employing the CSP³ polymers as photoresists, the molecular weight of the polymers is optimized based on the type of chemistry used and on the lithographic performance desired. Typically, the weight average molecular weight is in the range of 3,000 to 40,000 and optimally 7,000 to 20,000. The polydispersity is in the range 1.1 to 5, preferably 1.5 to 3.

In a photoresist, the solid components of the present invention are dissolved in an organic solvent. The amount of solids in the solvent or mixture of solvents ranges from about 2 weight % to about 30 weight %. The CSP³ polymer may be in the range of 5 weight % to 100 weight % of the solids; usually the CSP³ polymer will be in the range of 50 weight % to 99 weight % of the solids. Suitable solvents for such photoresists may include a glycol ether such as ethyl cellosolve, methyl cellosolve, propylene glycol monomethyl ether, diethylene glycol monomethyl ether, diethylene glycol monoethyl ether, dipropylene glycol dimethyl ether, propylene glycol n-propyl ether, or diethylene glycol dimethyl ether; a glycol ether ester such as ethyl cellosolve acetate, methyl cellosolve acetate, or propylene glycol monomethyl ether acetate; a carboxylate such as ethyl acetate, n-butyl acetate and amyl acetate; a carboxylate of a di-basic acid such as diethyloxylate or diethylmalonate; a dicarboxylates of a glycol such as ethylene glycol diacetate and propylene glycol diacetate; a hydroxy carboxylate such as methyl lactate, ethyl lactate, ethyl glycolate, and ethyl-3-hydroxy propionate; a ketone ester such as methyl pyruvate or ethyl pyruvate; an alkoxycarboxylic acid ester such as methyl 3-methoxypropionate, ethyl 3-ethoxypropionate, ethyl 2-hydroxy-2-methylpropionate, or methylethoxypropionate; a ketone such as methyl ethyl ketone, acetyl acetone, cyclopentanone, cyclohexanone or 2-heptanone; a ketone ether such as diacetone alcohol methyl ether; a ketone alcohol such as acetol or diacetone alcohol; a lactone such as butyrolactone; an amide derivative such as dimethylacetamide or dimethylformamide, anisole, and mixtures thereof.

Various other additives such as colorants, non-actinic dyes, anti-striation agents, plasticizers, adhesion promoters, dissolution inhibitors, coating aids, photospeed enhancers, and solubility enhancers (for example, certain small levels of solvents not used as part of the main solvent examples of which include glycol ethers and glycol ether acetates, valerolactone, ketones, lactones, and the like), and surfactants may be added to the photoresist composition before the solution is coated onto a substrate. Surfactants that improve film thickness uniformity, such as fluorinated surfactants, can be added to the photoresist solution. A sensitizer that transfers energy from a particular range of wavelengths to a different exposure wavelength may also be added to the photoresist composition. Often quencher bases are also added to the photoresist to give better chemical contrast, to give better LWR and/or to prevent t-tops or bridging at the surface of the photoresist image. Examples of bases are amines, ammonium hydroxide, and photosensitive bases. Common bases are trioctylamine, diethanolamine and tetrabutylammonium hydroxide. In the case in which the CSP³ polymer is intended for 193 nm, it may be found useful to incorporate a surface modification agent for immersion lithography. Examples are found in Irie et al., *Journal of Photopolymer Science and Technology* (2006), 19(4), 565-568.

The prepared photoresist composition solution can be applied to a substrate by any conventional method known in the photoresist art, including dipping, spraying, and spin coating. When spin coating, for example, the photoresist solution can be adjusted with respect to the percentage of solids content, in order to provide coating of the desired thickness, given the type of spinning equipment utilized, spinning speed and the amount of time allowed for the spinning process. Suitable substrates include silicon, aluminum, polymeric resins, silicon dioxide, doped silicon dioxide, silicon nitride, tantalum, copper, polysilicon, ceramics, aluminum/copper mixtures; gallium arsenide and other such Group III/V compounds. The photoresist may also be coated over antireflective coatings.

The photoresist coatings produced by the described procedure are particularly suitable for application to silicon/silicon dioxide wafers, such as are utilized in the production of microprocessors and other miniaturized integrated circuit components. An aluminum/aluminum oxide wafer can also be used. The substrate may also comprise various polymeric resins, especially transparent polymers such as polyesters.

The photoresist composition solution is then coated onto the substrate, and the substrate is treated at a temperature from about 70° C. to about 150° C. for from about 30 seconds to about 180 seconds on a hot plate or for from about 15 to about 90 minutes in a convection oven. This temperature treatment is selected in order to reduce the concentration of residual solvents in the photoresist, while not causing substantial thermal degradation of the solid components. In general, one desires to minimize the concentration of solvents at this first temperature. Treatment is conducted until substantially all of the solvents have evaporated and a thin coating of photoresist composition, on the order of half a micron (micrometer) in thickness, remains on the substrate. In a preferred embodiment the temperature is from about 95° C. to about 130° C. The treatment is conducted until the rate of change of solvent removal becomes relatively insignificant. The film thickness, temperature and time selection depends on the photoresist properties desired by the user, as well as the equipment used and commercially desired coating times. The coated substrate can then be imagewise exposed to actinic radiation, e.g., ultraviolet radiation, at a wavelength of from about 100 nm (nanometers) to about 300 nm, x-ray, electron beam, ion beam or laser radiation, in any desired pattern, produced by use of suitable masks, negatives, stencils, templates, and the like, etc.

The photoresist is then subjected to a post exposure second baking or heat treatment before development. The heating temperatures may range from about 90° C. to about 150° C., more preferably from about 90° C. to about 130° C. The heating may be conducted for from about 30 seconds to about 2 minutes, more preferably from about 60 seconds to about 90 seconds on a hot plate or about 30 to about 45 minutes by convection oven.

The exposed photoresist-coated substrates are developed by single or double puddle development on a track. Additional development techniques may include immersion in a developing solution or developing by spray development process. The solution is preferably agitated, for example, by nitrogen burst agitation. The substrates are allowed to remain in the developer until all, or substantially all, of the photoresist coating has dissolved from the exposed areas. Developers include aqueous solutions of ammonium or alkali metal hydroxides. After removal of the coated wafers from the developing solution, wafers are rinsed with water and then spin dried. Additionally, one may conduct an optional post-development heat treatment or bake to increase the coating's adhesion and chemical resistance to etching conditions and other substances. The post-development heat treatment can comprise the oven baking of the coating and substrate below the coating's softening point or UV hardening process. In industrial applications, particularly in the manufacture of microcircuitry units on silicon/silicon dioxide-type substrates, the developed substrates may be treated with a buffered, hydrofluoric acid base etching solution or dry etching.

Prior to dry etching the photoresist may be treated to electron beam curing in order to increase the dry-etch resistance of the photoresist.

Although this invention is susceptible to embodiment in many different forms, preferred embodiments of the invention have been shown. It should be understood, however, that the present disclosure is to be considered as an exemplification of the principles of this invention and is not intended to limit the invention to the embodiments illustrated.

We claim:

1. A polymer comprising at least one PDAD sequence, said sequence represented by the following diagram:

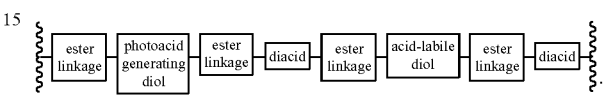

2. A polymer according to claim 1 comprising repeating units of the formula

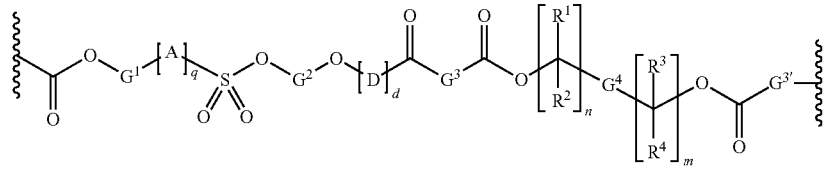

wherein

G$^1$ is selected from a direct bond, C$_1$-C$_8$ alkane, C$_1$-C$_8$ fluoroalkane, arene and fluoroarene;

A is G$^{2a}$-O—SO$_2$—C$_{1-8}$ hydrocarbon or G$^{2a}$-O—SO$_2$—C$_{2-14}$ hydrocarbon ether;

q is 0 or 1, with the proviso that if G$_1$ is a direct bond, q is 1;

G$^2$ and G$^{2a}$ are each independently an imide of empirical formula C$_{4-20}$H$_{3-12}$N$_{1-2}$O$_{2-5}$;

D is SO$_2$—C$_{1-6}$ fluoroalkane or SO$_2$-fluoroarene;

d is 0 or 1;

G$^3$ and G$^{3'}$ are selected independently from a direct bond or a C$_1$-C$_{20}$ hydrocarbon;

G$^4$ is a direct bond or C$_1$-C$_{20}$ hydrocarbon;

R$^1$, R$^2$, R$^3$ and R$^4$ are:

(a) independently in each occurrence a C$_1$-C$_8$ hydrocarbon; or (b) two R groups form a 5 or 6 membered carbocycle and the remaining R groups are independently in each occurrence a C$_1$-C$_8$ hydrocarbon; or (c) R$^1$ is H, R$^2$ is a C$_1$-C$_8$ hydrocarbon such that heterolytic cleavage of the oxygen-carbon bond adjacent R$^2$ produces a carbocation that is more stable than a secondary alkyl carbonium ion, and R$^3$ and R$^4$ are independently in each occurrence a C$_1$-C$_8$ hydrocarbon; or (d) R$^1$ and R$^3$ are H and R$^2$ and R$^4$ are C$_1$-C$_8$ hydrocarbons such that heterolytic cleavage of the oxygen-carbon bond adjacent R$^2$ and R$^4$ produces a carbocation that is more stable than a secondary alkyl carbonium ion; and m is zero or 1; n is zero or 1 and the sum of m+n is 1 or 2.

3. A polymer according to claim 2 wherein $G^2$ is

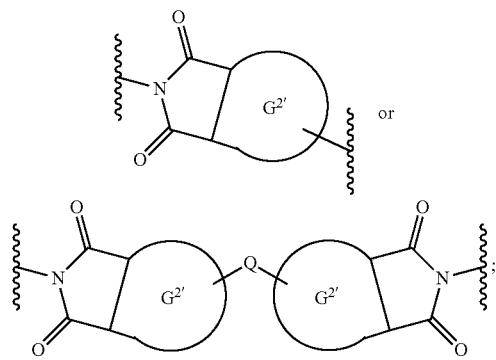

Q is selected from O, $CH_2$, $CH(CH_3)$ and $C(CH_3)_2$; and $G^{2'}$ is a fused carbocycle or heterocycle.

4. A polymer according to claim 2 comprising repeating units of the formula

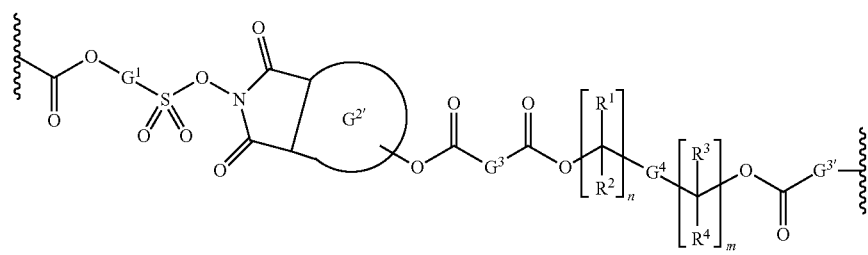

wherein
$G^1$ is a fluoroalkane or fluoroarene; and
$G^{2'}$ is a fused carbocycle or heterocycle.

5. A polymer according to claim 2 wherein $G^1$ is chosen from tetrafluorophenylene and polyfluoro($C_1$-$C_6$)alkyl.

6. A polymer according to claim 2 wherein
$G^1$ is a direct bond;
A is selected from $G^{2a}$-O—$SO_2$—$C_{1-6}$ alkyl, $G^{2a}$-O—$SO_2$—$C_{5-6}$ cycloalkyl or $G^{2a}$-O—$SO_2$-aryl and $G^{2a}$-O—$SO_2$—$C_{2-12}$ hydrocarbon ether; and
q is 1.

7. A polymer according to claim 6 wherein A is selected from $G^{2a}$-O—$SO_2$-phenyl, $G^{2a}$-O—$SO_2$-phenoxybenzene and $G^{2a}$-O—$SO_2$—$C_{1-4}$ alkyl.

8. A polymer according to claim 2 wherein
$G^1$ is fluoroalkane or fluoroarene;
q is 0; and
d is 1.

9. A polymer according to claim 8 wherein $G^1$ is selected from tetrafluorophenylene and polyfluoro($C_1$-$C_6$)alkyl and D is selected from $SO_2$-tetrafluorophenylene and $SO_2$-polyfluoro($C_1$-$C_6$)alkyl.

10. A polymer according to claim 2 wherein $G^2$ is chosen from:

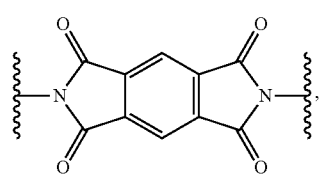

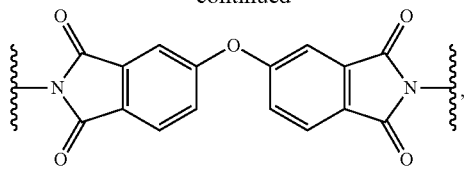

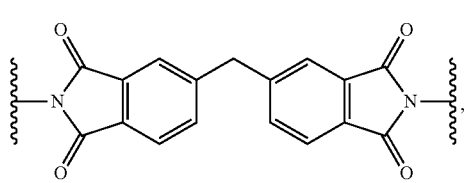

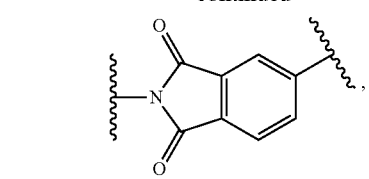

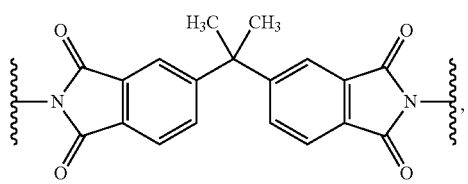

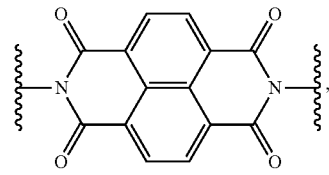

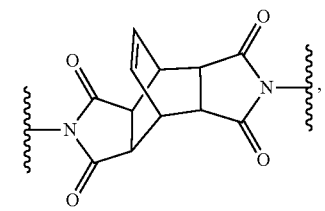

-continued

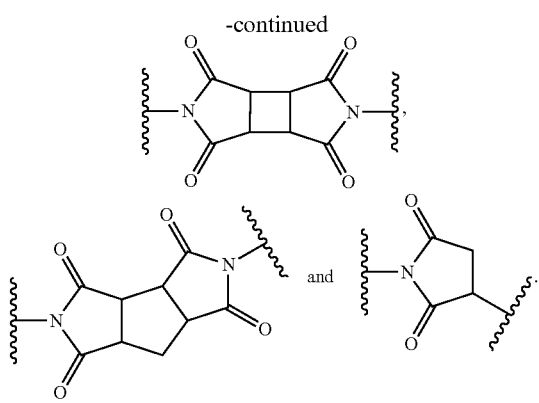

11. A polymer comprising repeating units of the formula

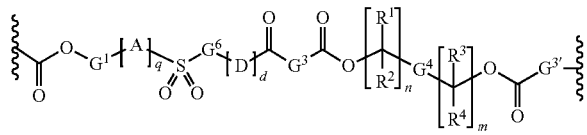

wherein
$G^1$ is selected from a direct bond, $C_1$-$C_8$ alkane, $C_1$-$C_8$ fluoroalkane, arene and fluoroarene;
A is $G^{2a}$-O—$SO_2$—$C_{1-8}$ hydrocarbon or $G^{2a}$-O—$SO_2$—$C_{2-14}$ hydrocarbon ether;
q is 0 or 1, with the proviso that if $G_1$ is a direct bond, q is 1;
$G^{2a}$ is an imide of empirical formula $C_{4-20}H_{3-12}N_{1-2}O_{2-5}$;
$G^6$ is selected from

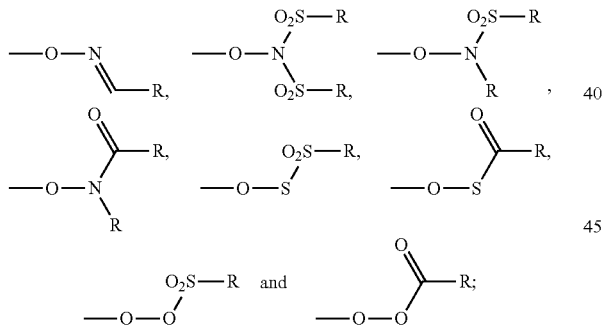

R is a residue having a hydroxyl substituent;
D is $SO_2$—$C_{1-6}$ fluoroalkane or $SO_2$-fluoroarene;
d is 0 or 1;
$G^3$ and $G^{3'}$ are selected independently from a direct bond or a $C_1$-$C_{20}$ hydrocarbon;
$G^4$ is a direct bond or $C_1$-$C_{20}$ hydrocarbon;
$R^1$, $R^2$, $R^3$ and $R^4$ are:
(a) independently in each occurrence a $C_1$-$C_8$ hydrocarbon; or
(b) two R groups form a 5 or 6 membered carbocycle and the remaining R groups are independently in each occurrence a $C_1$-$C_8$ hydrocarbon; or
(c) $R^1$ is H, $R^2$ is a $C_1$-$C_8$ hydrocarbon such that heterolytic cleavage of the oxygen-carbon bond adjacent $R^2$ produces a carbocation that is more stable than a secondary alkyl carbonium ion, and $R^3$ and $R^4$ are independently in each occurrence a $C_1$-$C_8$ hydrocarbon; or
(d) $R^1$ and $R^3$ are H and $R^2$ and $R^4$ are $C_1$-$C_8$ hydrocarbons such that heterolytic cleavage of the oxygen-carbon bond adjacent $R^2$ and $R^4$ produces a carbocation that is more stable than a secondary alkyl carbonium ion; and m is zero or 1; n is zero or 1 and the sum of m+n is 1 or 2.

12. A polymer according to claim 11 wherein R is a $C_1$-$C_{20}$ hydrocarbon substituted with a hydroxyl.

13. A polymer according to claim 2 wherein $G^3$ and $G^{3'}$ are chosen independently from: a direct bond, —$CH_2$—, —$CH_2CH_2$—, —$CH_2CH_2CH_2$—, —$CH_2CH_2CH_2CH_2$—, —CH=CH—, —C(=$CH_2$)$CH_2$—, —C($CH_3$)$_2$—, —C(Et)$_2$-, o-phenylene, m-phenylene, p-phenylene and bicyclo[2.2.1]heptan-2,3-diyl.

14. A polymer according to claim 2 wherein $G^4$ is chosen from a direct bond, —$CH_2$— and —$CH_2CH_2$— and $R^1$, $R^2$, $R^3$ and $R^4$ are methyl.

15. A polymer according to claim 2 wherein $G^4$ is chosen from a direct bond, —$CH_2$— and —$CH_2CH_2$—; n is 0; and $R^3$ and $R^4$ are methyl.

16. A polymer according to claim 2 wherein $G^4$ is chosen from a direct bond, —$CH_2$— and —$CH_2CH_2$—; m is 0; and $R^1$ and $R^2$ are methyl.

17. A polymer according to claim 2 wherein

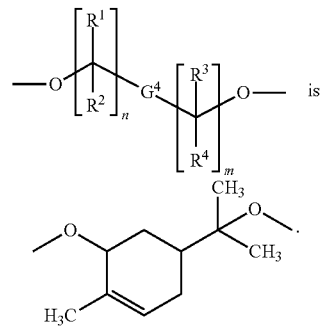

is

18. A polymer comprising repeating units of the formula

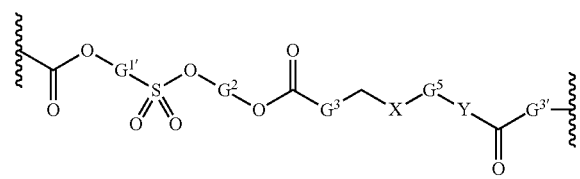

wherein
$G^{1'}$ is selected from $C_1$-$C_8$ alkane, $C_1$-$C_8$ fluoroalkane, arene and fluoroarene;
$G^2$ is an imide of empirical formula $C_{4-20}H_{3-12}N_{1-2}O_{2-5}$;
$G^3$ and $G^{3'}$ are selected independently from a direct bond or a $C_1$-$C_{20}$ hydrocarbon;
$G^5$ is chosen from a $C_2$-$C_{20}$ hydrocarbon, a heterocycle, an azaalkane, an oxaalkane and a phenolic residue, said hydrocarbon, heterocycle, azaalkane, or oxaalkane optionally substituted with from one to four substituents chosen from oxo, hydroxy and acetyl; and X and Y are chosen independently from nitrogen and oxygen.

19. A polymer according to claim 18 wherein —X-G$^5$-Y— is chosen from

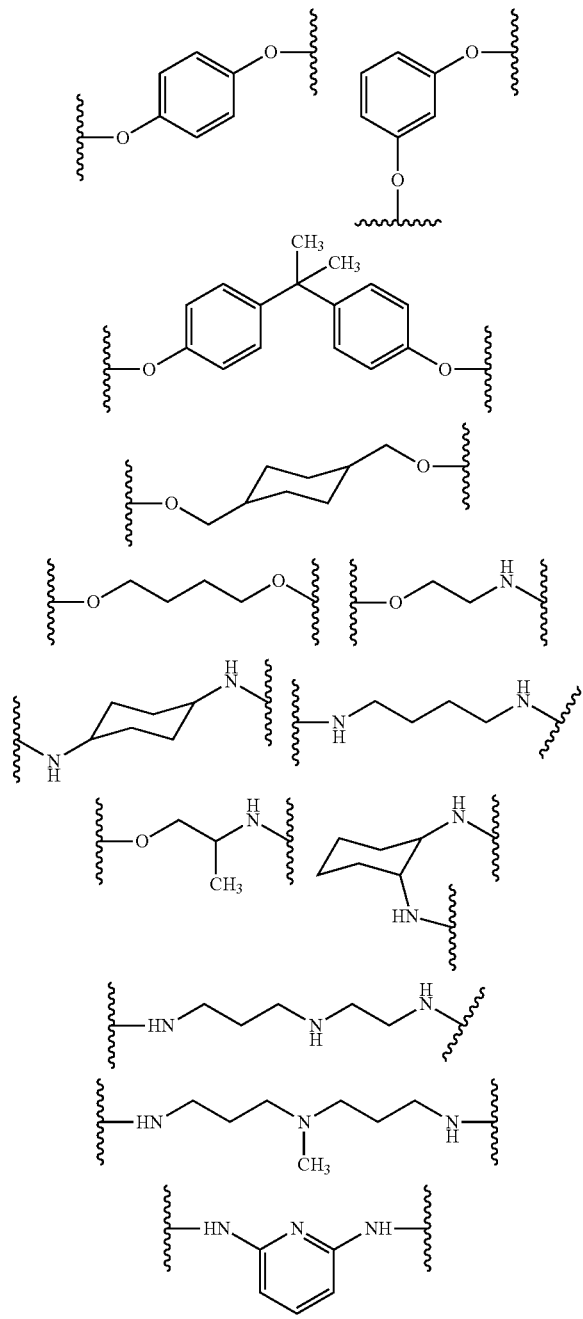

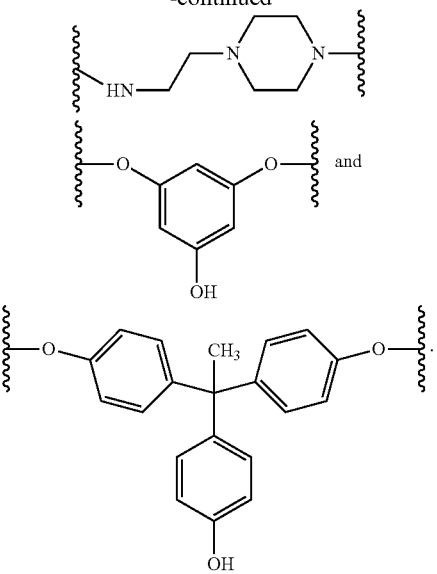

20. A method for patterning a substrate comprising:
(a) depositing a polymer as described in claim 1 on a surface of a substrate;
(b) imagewise exposing said polymer on said surface to actinic radiation;
(c) developing said imagewise exposed polymer to remove portions of said polymer.

21. A method for making a semiconductor device comprising:
(a) depositing a polymer as described in claim 1 on a surface of a substrate;
(b) imagewise exposing said polymer on said surface to actinic radiation;
(c) developing said imagewise exposed polymer to remove portions of said polymer and expose portions of said surface;
(d) altering the surface of said substrate; and
(e) removing remaining polymer from said surface.

22. A semiconductor device produced by the method of claim 21.

23. A photoresist formulation comprising a solvent and a polymer according to claim 1.

24. A photoresist formulation according to claim 23 additionally comprising one or more of a quencher base, a surfactant, a surface leveling agent and an acid amplifier.

25. A photoresist formulation according to claim 23 additionally comprising a surface modification agent for immersion lithography.

26. A photoresist comprising a polymer according to claim 1.

* * * * *